(12) United States Patent
Smith et al.

(10) Patent No.: US 9,989,658 B2
(45) Date of Patent: Jun. 5, 2018

(54) METHOD OF, AND APPARATUS FOR, PROCESSING POSITRON EMISSION TOMOGRAPHY DATA

(71) Applicant: THE UNIVERSITY COURT OF THE UNIVERSITY OF EDINBURGH, Edinburgh (GB)

(72) Inventors: Gary Douglas Smith, Edinburgh (GB); Daniel Watts, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 0 days. days.

(21) Appl. No.: 15/620,321

(22) Filed: Jun. 12, 2017

(65) Prior Publication Data
US 2017/0276809 A1    Sep. 28, 2017

Related U.S. Application Data

(63) Continuation-in-part of application No. PCT/GB2015/053786, filed on Dec. 10, 2015.

(30) Foreign Application Priority Data

Dec. 12, 2014 (GB) .................................. 1422144.4

(51) Int. Cl.
*G01T 1/164* (2006.01)
*G01T 1/29* (2006.01)

(52) U.S. Cl.
CPC .................. *G01T 1/2985* (2013.01)

(58) Field of Classification Search
CPC .... G01T 1/2985; G01T 1/1647; G01T 1/1648
(Continued)

(56) References Cited

FOREIGN PATENT DOCUMENTS

| WO | 2006058432 | 6/2006 |
|----|------------|--------|
| WO | 2013164731 | 11/2013 |
| WO | 2007007063 | 1/2017 |

OTHER PUBLICATIONS

International Search Report for International Application No. PCT/GB2015/053786 dated Mar. 15, 2016.
(Continued)

*Primary Examiner* — David Porta
*Assistant Examiner* — Meenakshi Sahu
(74) *Attorney, Agent, or Firm* — Womble Bond Dickinson (US) LLP

(57) ABSTRACT

A positron emission tomography (PET) data processing method comprises obtaining PET data from a PET detector, wherein the PET detector comprises an array of detector elements, and wherein the PET data is representative of a PET measurement of at least part of a subject. The method comprises identifying in the PET data a plurality of paired events, wherein each paired event comprises a first photon event in a first region of the PET detector and a second photon event in a second region of the PET detector. The first photon event comprises an energy deposition in a first detector element of the array or in a first detection region of the first detector element due to a scattering of a first photon at a first azimuthal scattering angle and an associated energy deposition by the scattered first photon in a second detector element of the array or in a second detection region of the first detector element or of the second detector element. The second photon event comprises an energy deposition in a third detector element of the array or in a third detection region of the third detector element due to a scattering of a second photon at a second azimuthal scattering angle and an associated energy deposition by the scattered second photon in a fourth detector element of the array or in a fourth detection region of the third detector element or of the fourth detector element. The method further comprises processing
(Continued)

the PET data in dependence on the first and second azimuthal scattering angles for the paired events.

39 Claims, 11 Drawing Sheets

(58) Field of Classification Search
USPC .............................. 250/363.03, 363.04, 362
See application file for complete search history.

(56) References Cited

OTHER PUBLICATIONS

A. L. McNamara, "Towards Optimal Imaging with PET: an in silico feasibility study", Physics in Medicine & Biology, Institute of Physics and Engineering in Medicine, vol. 59, No. 24, Nov. 21, 2014 pp. 7587-7600.
Letter to the Editor, Monte Carlo PET simulations: effect of photon polarization on scatter estimates, Phys. Med. Bio; 1992, vol. 37, No. 5, 1185-1188 (correlationPET1992), Alden N Bice.
Improved image reconstruction in small animal PET using a priori estimates of single pixels events, Espana et al, 2007 IEEE Nuclear Science Symposium Conference Record.
Scatter modelling and compensation in emission tomography, Habib Zaidi, Kenneth F. Koral 2004.
Kamae et al., A new method to measure energy, direction, and polarization of gamma rays, Nuclear Instruments and Methods in Physics Research Section A: Accelerators, Spectrometers, Detectors and Associated Equipment, vol. 260, Issue 1, Oct. 1, 1087, pp. 254 to 257.
Everett et al., Gamma-radiation imaging system based on the Compton effect, Electrical Engineers, Proceedings of the Institution of Electrical Engineers, vol. 124, Issue 11, Nov. 1977. Retrieved from http://ieexplore.ieee.org/xpls/abs_all.jsp?arnumber=5253391&tag=1.
Gu et al., "Study of high-resolution, 3D positioning cadmium zinc telluride detector for PET", Phys. Med. Bio; 56 (2011) 1563-1584. Retrieved from http://miil.stanford.edu/publications/files/178_PUB.pdf.
Snyder et al., Angular Correlation of Scattered Annihilation Radiation, Brookhaven National Library, Upton, New York, Nov. 24, 1947, Physical Review, vol. 73, No. 5, Mar. 1, 1948.
Pryce et al., Angular Correlation Effects with Annihilation Radiation, Clarendon Laboratory, Oxford, Jun. 18. Nature, No. 4065, Sep. 27, 1947.
McNamara et al., Positron emission tomography coincidence detection with photon polarization correlation, School of Physics, University of Sydney, NSW, Australia; Australia Nuclear Science and Technology Oganisation (ANSTO), Lucas Heights, NSW, Australia; Mullard Space Science Laboratory, University College London, Holmbury St Mary, Surrey, UK; Medical Imaging 2013: Physics of Medical Imaging, edited by Robert M. Nishikawa, Bruce R. whiting, Christoph Hoeschen, Proc. Of SPIE vol. 8668, 86681U. © 2013 SPIE. CCC code: 1605-7422/13/$18. doi: 10.1117/12.2007794.
Wagadarikar et al., Sensitivity Improvement of Time-of-Flight (ToF) PET Detector Through Recovery of Compton Scattered Annihilation Photons, IEEE Transactions on Nuclear Science, vol. 61, No. 1, Feb. 2014.
Levin, New Imaging Technologies to Enance the Molecular Sensitivity of the Positron Emmision Tomography, Proceedings of the IEEE, vol. 96, No. 3, Mar. 2008.
Polycarpou et al., A comparative investigation of scatter correction in 3D PET, Division of Imaging Sciences and Biomedical Engineering, School of Medicine, Kin's College London, UK; International Conference on Image Optimisation in Nuclear Medicine (OptiNM), Journey of Physics: Conference Series 317 (2011) 012022, dio:10.1088/1742-6596/317/1/012022, retrieved from http://iopscience.iop.org/1742-6596/317/1/012022/pdf/1742-6596_317_1_012022.pdf.
Introduction to PET Physics, Section 6, Ramsey Badawi, Jan. 12, 1999 http://depts.washington.edu/nucmed/IRL/pet_intro/intro_sm/section6_html#6.4 and papers cited therein.
Positron emission tomography, Wikipedia, 2006. Retrieved from http://en.wikipedia.org/wiki/Positron_emission_tomography.
Ruggles et al., "Positron Emission Tomography (PET) for Flow Measurement", Advanced Materials Research, vols. 301-303, pp. 1316-1321, 2011, retrieved from http://www.scientific.net/AMR.301-303.1316.
Barker et al., "Fluid Flow and Solute Movement in Sadstones: The Onshore UK Permo-Triassic Red Bed Sequence", Geological Society of London, 2006, pp. 238 http://books.google.co.uk/books?id=W7Svte0sBBoC&pg=PA238&lpg=PA238&dq=pet+image+fluid+flow&source=bl&ots=pxD8wyUEC8&tsig=dfPKyHRqK5iUOcz2YmSDxkN6hb&chl=en&sa=X&ei=BAp-pVOrUEY24aa3wgoAJ&ved=0CE0Q6AEwBw#v=onepage&q=pet%20image%20fluid%20flow&f=false.
Parker et al., Industrial positron-based imaging: Principles and applications, 1994, retrieved from http://www.sciencedirect.com/science/article/pii/0168900294908052.
Nuclear Physics, University of Birmingham Retrieved Oct. 2017 from http://www.birmingham.ac.uk/research/activity/nuclear/research-themes/nuclear-physiGS.aspx.
Melcher et al., "Scintillation Crystals for PET", The Journal of Nuclear Medicine, vol. 41, No. 6, Jun. 2000. Retrieved from http://jnm.snmjournals.org/content/41/6/1051.full.pdf.
Woody et al., "RatCAP: a small, head-mounted PET tomograph for imaging the brain of an awake RAT", Nuclear Instruments and Methods in Physics Research A 527 (2004) 166-170, retrieved from http://synchropet.com/wp-content/uploads/2014/09/science.pdf.
Bruno et al., "Measurement of linear polarization of positron annihilation photons", Il Nuovo Cimento B (1971-1996), 1977, vol. 40, No. 1, p. 143, retrieved from http://link.springer.com/article/10.1007%2FBF02739186.

METHOD OF, AND APPARATUS FOR, PROCESSING POSITRON EMISSION TOMOGRAPHY DATA

The present invention relates to a method and apparatus for processing position emission tomography (PET) data, for example for processing PET data to correct for in-subject scattering effects and/or random effects.

BACKGROUND

Positron emission tomography (PET) is a widely used medical imaging modality. PET scanning methods may be used to obtain an image of a subject, for example an image of a patient. In medical PET scanning, a radionuclide is introduced into the body of a patient and concentrates in an area of interest of the patient (for example, a tumour). The radionuclide emits positrons, which annihilate with electrons to produce pairs of back-to-back photons, each photon having an energy of 511 keV.

The patient or other subject is placed in a PET detector, which uses a plurality of detector elements to detect the emitted photons. The detector elements may be arranged as a ring-shaped array around the patient and may comprise, for example, scintillator crystals with associated photomultiplier tubes.

When a photon deposits energy in one of the detector elements, the PET system records when and where the energy deposit occurs, and may record how much energy was deposited. If a photon deposits all of its energy in a single detector element, an energy of around 511 keV will be recorded. Known PET systems use events in which energy depositions of around 511 keV are recorded in a pair of detector elements at opposite sides of the PET detector within a given time window (for example, 10 ns). Such events may be assumed to correspond to a pair of back-to-back photons from a positron annihilation. The system determines a line of response between the pair of detectors and assumes that the annihilation event occurred on that line of response.

However, some emitted photons undergo scattering before reaching a detector element. For example, emitted photons may undergo scattering in the body of the patient or other subject. Scattered photons may change direction on scattering.

Therefore, if one or both photons in a back-to-back pair is scattered before being received by a detector element, a line drawn between the detector elements at which the pair of photons are received may no longer pass through the location of the annihilation event. Such events may be called scattering events and the process for correcting for such events in data processing may be called scatter correction.

Furthermore, in some cases two annihilations occur very close in time and a first photon from one back-to-back pair may be incorrectly matched with a second photon from another back-to-back pair. Such events may be called random coincidences. Random events may also occur if a scintillator crystal self-emits light.

In some events, all of the energy of each incident photon is deposited in a single detector element, for example a single scintillator crystal. In other events, a photon undergoes Compton scattering within a first detector element, depositing part of its energy in that first detector element, and then deposits the remainder of its energy in one or more further detector elements. Events in which both of the photons undergo scattering in the detector (and therefore each photon deposits its energy in two or more detector elements) may be referred to as paired Compton or PC PET events.

Both scattering events and random coincidences add noise to the imaging data. A number of methods have been used to attempt to correct for scattering events and random coincidences in PET imaging data. For example, by setting a threshold close to 511 keV, many scattering events may be removed from the data (because energy is lost when the photon is scattered). However, if the threshold is set too close to 511 keV then a number of true events may also be removed. The typical energy resolution of the photon scintillator detectors employed in PET machines may limit the achievable separation of true and scattered events.

In some existing systems, a Monte Carlo simulation method is used to attempt to correct for scattering events. A first image is reconstructed using all the events received by the PET detector in which two energy depositions of around 511 keV were recorded within the same time window. This image may include scattering events, and so may be noisy. In typical PET imaging in three dimensions, the scattered photons may comprise 30% to 50% of the measured data.

A Monte Carlo simulation is then used to construct a scattering model that best matches the observed data. The Monte Carlo simulation models the distribution of mass inside the patient that is most likely to have resulted in the observed events. The resulting scattering model may be used to weight the event data, for example to weight events that are determined by the model to be scattering events out of the image to produce scatter-corrected data. An image may then be reconstructed from the scatter-corrected data. Scatter modelling and scatter compensation techniques are discussed in Habib Zaidi and Kenneth F. Koral, Scatter Modelling and Compensation in Emission Tomography, Eur J Nucl Med Mol Imaging 2004 May; 31(4); 761-82.

In some current systems, the construction of the scattering model may take some hours and may require considerable computing power. It may not be possible to construct the scattering model in real time, for example in the same session in which the PET data is acquired. For large imaging sources, PET systems may employ an additional scan with an X-ray source to map the source distribution. Performing an additional scan with an X-ray source may add dose to the scan.

It has previously been suggested that it may be possible to distinguish scattered events from unscattered events if polarisation information were available for each incident photon, for example if a polarimeter were used to measure the polarisation of each photon that is incident upon a detector (see, for example, McNamara et al, Positron emission tomography coincidence detection with photon polarization correction, Medical Imaging 2013: Physics of Medical Imaging, Proc of SPIE Vol 8668, 86681). McNamara et al simulated back to back photon pairs with orthogonal polarisation and used the simulation to extract the scalar product of the polarisation vectors of the two detected photons when they reach the detector. Current systems may not be capable of measuring the polarisation of the two photons event-by event.

Some PET data reconstruction methods have been proposed in which a Compton camera detector is used, the Compton camera comprising a scatterer in front of the scintillator crystals (see, for example, WO 2006/058432). A Compton camera may determine a cone describing a possible gamma source location for each event. The intersection of many ellipses may be used to determine the source location.

SUMMARY

Certain embodiments provide a positron emission tomography (PET) detection method comprising obtaining PET data from a PET detector wherein the PET detector comprises an array of detector elements, and wherein the PET data is representative of a PET measurement of at least part of a subject.

The detector elements may comprise scintillator elements. Each scintillator element may comprise at least one scintillator crystal. The detector elements may comprise semiconductor elements. Each semiconductor element may comprise at least one semiconductor crystal. Each of the detector elements may comprise a plurality of detection regions.

The method may further comprise identifying in the PET data a plurality of paired events, wherein each paired event comprises a first photon event in a first region of the PET detector and a second photon event in a second region of the PET detector.

The first photon event may comprise an energy deposition due to a scattering of a first photon at a first azimuthal scattering angle and an associated energy deposition by the scattered first photon. The energy deposition due to the scattering of the first photon may be in a first detection region of a first detector element. The associated energy deposition by the scattered first photon may be in a second detection region. The second detection region may be a detection region of the first detector element. The second detection region may be a detection region of a second detector element.

The second photon event may comprise an energy deposition due to a scattering of a second photon at a second azimuthal scattering angle and an associated energy deposition by the scattered second photon. The energy deposition due to the scattering of the second photon may be in a third detection region of a third detector element. The associated energy deposition by the scattered first photon may be in a fourth detection region. The fourth detection region may be a detection region of the third detector element. The fourth detection region may be a detection region of a fourth detector element.

The method may further comprise processing the PET data in dependence on the first and second azimuthal scattering angles for the paired events.

In an aspect of the invention there is provided a positron emission tomography (PET) detection method comprising obtaining PET data from a PET detector wherein the PET detector comprises an array of detector elements, for example scintillator elements, and wherein the PET data is representative of a PET measurement of at least part of a subject. The method further comprises identifying in the PET data a plurality of paired events, wherein each paired event comprises a first photon event in a first region of the PET detector and a second photon event in a second region of the PET detector. The first photon event comprises an energy deposition in a first detector element, for example a first scintillator element of the array due to a scattering of a first photon at a first azimuthal scattering angle and an associated energy deposition by the scattered first photon in a second detector element, for example a second scintillator element of the array, and the second photon event comprises an energy deposition in a third detector element, for example a third scintillator element of the array due to a scattering of a second photon at a second azimuthal scattering angle and an associated energy deposition by the scattered second photon in a fourth detector element, for example a fourth scintillator element of the array. The method further comprises processing the PET data in dependence on the first and second azimuthal scattering angles for the paired events.

By using azimuthal scattering angles, a proportion of events that have been scattered within the subject may be distinguished from a proportion of events that have not been scattered. It may be possible to process PET data to distinguish a proportion of scattered events from a proportion of non-scattered events rapidly, for example in real time. The effect of scattering events on a reconstructed image may be reduced using the polarisation properties of entangled photons. Therefore images with improved signal to noise may be produced.

The processing of the PET data in dependence on first and second azimuthal scattering angles for the paired events may comprise distinguishing a proportion of paired events that relate to non-entangled pairs of photons from a proportion of paired events that relate to entangled pairs of photons. The non-entangled pairs of photons may have lost entanglement due to scattering within the subject.

At least some of the non-entangled pairs of photons may be incorrectly paired due to incorrect pairing of the first photon event and second photon event. The photons may have originated from separate positron annihilations. Events in which incorrect pairing has occurred may be random coincidences.

The array may comprise a single layer of scintillator elements. Each of the plurality of scintillator elements may be placed at approximately the same radial distance from a central axis of the PET detector.

Known PET detector arrays may comprise a single layer of scintillator elements, and the method may be used in processing data obtained using such known PET detector arrays. Using a single layer may result in the use of many events that occur in a region of polar scattering angle θ for which the number of events is expected to be high and for which azimuthal asymmetry is expected to be high.

The array may comprise a multi-layer array. Each layer may be placed at a different radial distance from a central axis. The array may comprise an axial PET array. The array may comprise a CZT (cadmium zinc telluride) detector array. A CZT detector array may comprise multiple layers of detector elements to improve spatial resolution. A detector array comprising multiple layers may have the ability to reduce parallax error by providing depth of interaction information.

Each scintillator element in the array may receive some energy depositions in which energy is deposited due to scattering of a photon, and some energy depositions by scattered photons. Each scintillator element may be capable of receiving events which all the energy of a photon is deposited in the scintillator element (511 keV photon events) as well as being capable of receiving events in which part of a photon energy is deposited in the scintillator element.

The processing of the PET data in dependence on first and second azimuthal scattering angles for the paired events may comprise determining a relative azimuthal scattering angle for each paired event. Determining a relative azimuthal scattering angle for each of the plurality of paired events may comprise, for each paired event, determining a difference between the first azimuthal scattering angle and second azimuthal scattering angle. There may be an ambiguity in which a relative azimuthal scattering angle of x+180° may not be distinguishable from a relative azimuthal scattering angle of x°. The relative azimuthal scattering angle may be determined to be x° or x+180° with a precision given by the geometry of the PET detection system.

The method may further comprise determining the first azimuthal scattering angle in dependence on the relative positions of the first scintillator element and second scintillator element, and determining the second azimuthal scattering angle in dependence on the relative positions of the third scintillator element and fourth scintillator element.

Processing the PET data in dependence on the first and second azimuthal scattering angles for the paired events may comprise determining a first set of paired events having a first range of values of relative azimuthal scattering angle and a second set of paired events having a second range of values of relative azimuthal scattering angle.

The first range of values of relative azimuth scattering angle may comprise at least one range of values in which a plot of number of counts against scattering angle, optionally relative azimuthal scattering angle, has a peak. The second range of values of scattering angle, optionally relative azimuthal scattering angle, may comprise at least one range of values in which a plot of number of counts against relative scattering angle has a trough. Each of the peak and/or trough may comprise a turning point in the plot and/or a point where a first derivative with respect to scattering angle of the plot has a value substantially equal to zero.

A plot of number of counts against relative scattering angle may have a $\cos(2\Delta\varphi)$ dependence, where $\Delta\varphi$ is the relative scattering angle. The first range of values of relative scattering angles may comprise a range of values in an interval around $-90°$ and a range of values in an interval around $90°$. Each interval may be, for example, $10°$, $20°$, $30°$, $40°$, $50°$, $60°$, $70°$, $80°$ or $90°$. The first range of values of relative azimuthal scattering angle may comprise values between $-120°$ and $-60°$ and values between $60°$ and $120°$. The second range of values of relative scattering angles may comprise a range of values in an interval around $0°$ and a range of values in an interval around $180°$. Each interval may be, for example, $10°$, $20°$, $30°$, $40°$, $50°$, $60°$, $70°$, $80°$ or $90°$. The second range of values of relative azimuthal scattering angle may comprise values between $-150°$ and $150°$ and values between $-30°$ and $30°$.

The method may comprise reconstructing a first image from the first set of paired events, reconstructing a second image from the second set of paired events, weighting the first image with a first weight and weighting the second image with a second weight, and combining the weighted images. One of the first weight and second weight may be 1, and the other of the first weight and second weight may be $-1$.

The first weight and second weight may be non-integer weights. Weights for the first set of paired events and for the second set of paired events may be calculated using a plurality of fit parameters determined by fitting a function to a plurality of azimuthal asymmetry distributions. Fit parameters may be determined by fitting the function $F(\Delta\varphi, \theta_1, \theta_2) = a + b\cos(\Delta\varphi) + c\cos(2\Delta\varphi)$ to a plurality of azimuthal asymmetry distributions. Events may be weighted event-by-event.

The method may further comprise reconstructing a first image from the first set of paired events, reconstructing a second image from the second set of paired events, and subtracting one of the first image and the second image from the other of the first image and the second image.

Reconstructing a first image from the first range of values (which may be called peak events) and a second image from the second range of values (which may be called trough events) and subtracting the first and second images may provide a rapid method for image reconstruction in which noise is reduced by removing at least some scattering events. In some circumstances, the image reconstruction may be performed in real time.

Processing the PET data in dependence on the first and second azimuthal scattering angles for the paired events may comprise determining a distribution of azimuthal scattering angles, optionally relative azimuthal scattering angles.

Processing the PET data in dependence on the first and second azimuthal scattering angles for the paired events may further comprise a comparison of the determined distribution to an ideal distribution for paired events resulting from entangled photons.

Comparing the determined distribution to an ideal distribution may enable a likelihood or probability that the paired events are the result of a false coincidence to be determined. The paired events may result from a false coincidence due to at least one of the following reasons: one or both photons scattering in the subject; the photons originating from separate annihilation events; or one or more energy measurements resulting from a source of noise.

Processing the PET data in dependence on the first and second azimuthal scattering angles for the paired events may further comprise adjusting an event count in dependence on the determined distribution of scattering angles, optionally relative scattering angles.

Determining a distribution of relative azimuthal scattering angles may comprise determining a distribution of relative azimuthal scattering angles for each of a plurality of lines of response.

Adjusting an event count in dependence on the determined distribution of scattering angle, optionally relative scattering angle, may comprise adjusting an event count for each line of response in dependence on the determined distribution of relative azimuthal scattering angle for the line of response. The method may further comprise reconstructing an image using the adjusted event count. Adjusting an event count for each line of response may comprise applying a weight to a line of response according to the number of false coincidences that are expected to be present. Each false coincidence may be due, for example, to at least one of the following reasons: one or both photons scattering in the subject; the photons originating from separate annihilation events; or one or more energy measurements resulting from a source of noise.

Reconstructing an image may comprise reconstructing an image using at least one of back-projection, filtered back-projection and expectation maximisation.

The method may further comprise, for each paired event, determining a polar scattering angle for the first photon event and a polar scattering angle for the second photon event. The method may further comprise selecting paired events in dependence on the determined polar scattering angle for the first photon event and the determined polar scattering angle for the second photon event. There may be an ambiguity in the determination of polar scattering angle.

The method may further comprise determining a line of response for each of the paired events. An average line of response may be determined. A choice of lines of response may be determined.

The PET detector may be configured such that PET data may be obtained individually from each of the plurality of scintillator elements.

The PET data may comprise time, energy and position data for each of a plurality of energy depositions.

The PET detector may comprise a medical PET detector and the subject may comprise a human or animal subject. The at least part of the subject may comprise at least one of a brain, a head, a heart, a torso, an abdomen, a tumour, a breast, a blood flow system, an organ.

The PET detector may comprise an industrial PET detector. The at least part of the subject may comprise at least part of an industrial pipe, an engine, a gearbox or a porous substance.

The plurality of detector elements may comprise a plurality of semiconductor detector elements.

The plurality of semiconductor detector elements may comprise cadmium zinc telluride (CZT) detector elements or CdTe detector elements or Si detector elements or Ge detector elements.

In a further aspect of the invention there is provided a positron emission tomography (PET) detection method comprising obtaining PET data from a PET detector wherein the PET detector comprises an array of detector elements and wherein the PET data is representative of a PET measurement of at least part of a subject. The method further comprises identifying in the PET data a plurality of paired events, wherein each paired event comprises a first photon event in a first region of the PET detector and a second photon event in a second region of the PET detector. The first photon event comprises an energy deposition in a first detection region of a first detector element of the array due to a scattering of a first photon at a first azimuthal scattering angle and an associated energy deposition by the scattered first photon in a second detection region of the first detector element or of a second detector element. The second photon event comprises an energy deposition in a third detection region of a third detector element of the array due to a scattering of a second photon at a second azimuthal scattering angle and an associated energy deposition by the scattered second photon in a fourth detection region of the third detector element or of a fourth detector element. The method further comprises processing the PET data in dependence on the first and second azimuthal scattering angles for the paired events.

In a further aspect of the invention there is provided a computer program product comprising computer-readable instructions configured to perform the method.

In another aspect of the invention there is provided a method adapting a PET apparatus by installing processing software configured to perform the method. The method may comprise retrofitting an existing PET apparatus.

In a further, independent aspect of the invention there is provided a positron emission tomography (PET) apparatus, comprising a PET detector, a coincidence detector and a processing unit, wherein the PET detector comprises an array of scintillator elements, a plurality of light detectors configured to detect light emitted by the scintillator elements, and readout electronics for reading out signals from the plurality of light detectors. The PET detector is configured to obtain PET data representative of a PET measurement of at least part of a subject. The coincidence detector is configured to identify in the PET data a plurality of paired events, wherein each paired event comprises a first photon event in a first region of the PET detector and a second photon event in a second region of the PET detector. The first photon event comprises an energy deposition in a first scintillator element of the array due to a scattering of a first photon at a first azimuthal scattering angle and an associated energy deposition by the scattered first photon in a second scintillator element of the array. The second photon event comprises an energy deposition in a third scintillator element of the array due to a scattering of a second photon at a second azimuthal scattering angle and an associated energy deposition by the scattered second photon in a fourth scintillator element of the array. The processing unit is configured to process the PET data in dependence on the first and second azimuthal scattering angles for the paired events.

The plurality of scintillator elements may comprise an array of scintillator crystals. The scintillator crystals may comprise at least one of Cerium-doped Lutetium Yttrium Orthosilicate ($Lu_2SiO_5[Ce]$ or LSO) crystals, bismuth germanium oxide ($Bi_4Ge_3O_{12}$ or BGO) crystals, cerium-doped gadolinium oxyorthosilicate ($Gd_2SiO_5[Ce]$ or GSO) crystals, Lutetium Orthosilicate crystals, thallium-doped sodium iodide (NeI[TI]) crystals, barium fluoride ($BaF_2$) crystals, yttrium aluminate ($YalO_3[Ce]$ or YAP) crystals, cadmium tungstate ($CdWO_4$) crystals, barium fluoride ($BaF_2$) crystals, cesium fluoride (CsF) crystals, sodium-doped cesium iodide (CsI[Na]) crystals, thallium-doped cesium iodide crystals (CsI[TI]) crystals, europium-doped calcium fluoride ($CaF_2$[Eu]) crystals. The plurality of light detectors may comprise at least one of photomultiplier tubes, avalanche photodiodes and silicon photomultipliers. The readout electronics may be configured to provide crystal-by-crystal readout. The readout electronics may be configured to provide readout of groups of crystals.

In a further, independent aspect of the invention there is provided a PET data processing apparatus comprising a coincidence detector and a processing unit, wherein the coincidence detector is configured to receive PET data representative of a PET measurement of at least part of a subject and to identify in the PET data a plurality of paired events, wherein each paired event comprises a first photon event in a first region of the PET detector and a second photon event in a second region of the PET detector. The first photon event comprises an energy deposition in a first scintillator element of the array due to a scattering of a first photon at a first azimuthal scattering angle and an associated energy deposition by the scattered first photon in a second scintillator element of the array. The second photon event comprises an energy deposition in a third scintillator element of the array due to a scattering of a second photon at a second azimuthal scattering angle and an associated energy deposition by the scattered second photon in a fourth scintillator element of the array. The processing unit is configured to process the PET data in dependence on the first and second azimuthal scattering angles for the paired events.

There may be provided a method, apparatus or computer program product substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which:—

Figure 1:
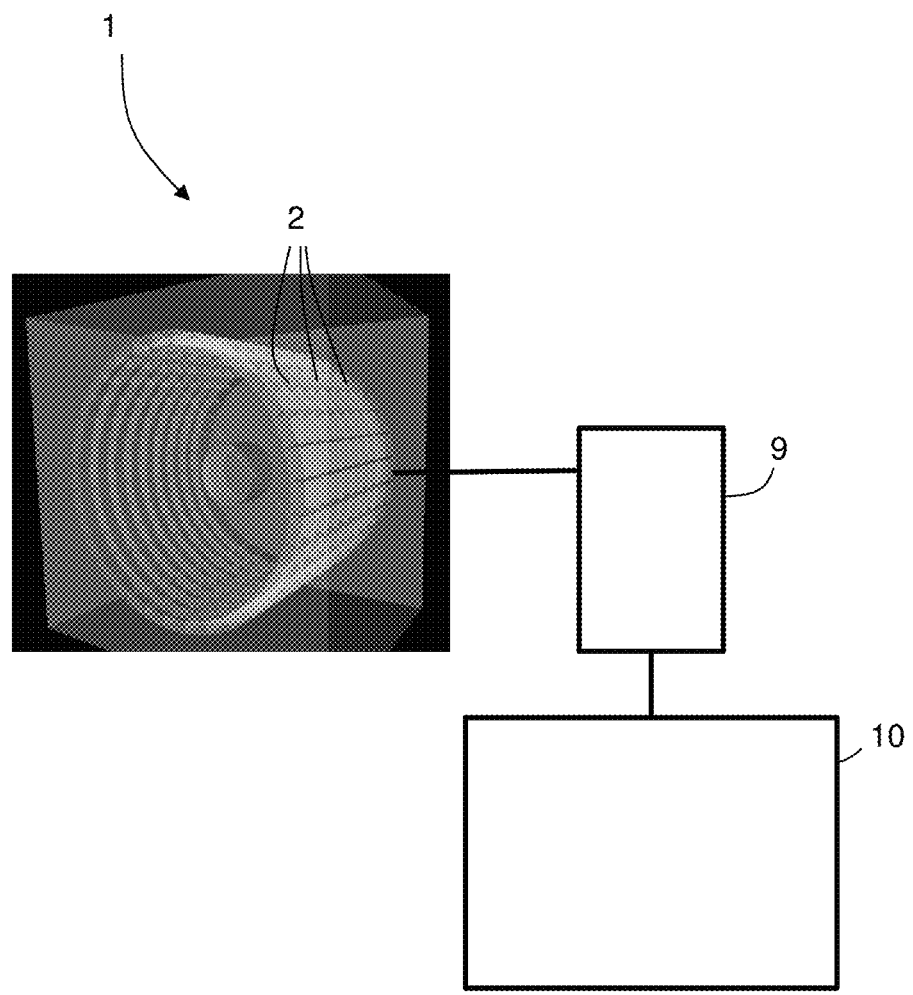
FIG. 1 is a schematic diagram of a PET scanner.

In an embodiment, PET data is received and processed using a PET scanner system 1. PET scanner system 1 is schematically illustrated in FIG. 1.

PET scanner system 1 comprises a PET detector apparatus, the PET detector apparatus comprising a plurality of detector elements 2 arranged in an array. The detector elements 2 comprise scintillator crystals and the array comprises multiple rings of scintillator crystal, the rings being of equal diameters. A single layer of scintillator crystals is used. Each scintillator crystal is placed at approximately the same distance from a central axis of the PET scanner. In other embodiments, a different detector geometry may be used.

In some embodiments, the array of detector elements comprises a plurality of blocks, each comprising a respective array of crystals. Each crystal in the block may be at a slightly different radius from the central axis since the block surfaces are flat and not curved. In some embodiment, the detector apparatus has a non-circular geometry, for example hexagonal with opposite sides operated in coincidence.

In the present embodiment, the scintillator crystals are LYSO crystals (Cerium-doped Lutetium Yttrium Orthosilicate). In other embodiments, any suitable scintillator crystals may be used, for example BGO (bismuth germanium oxide), GSO (gadolinium oxyorthosilicate), LSO (Lutetium Orthosilicate) or sodium iodide (NaI). In the present embodiment, each scintillator crystal is 4×4×22 mm in size. In other embodiments, crystals of any suitable dimensions may be used.

In further embodiments, the detector elements 2 may comprise a different scintillator material, for example a liquid scintillator material or gas scintillator. Each detector element may be a portion of a liquid scintillator or gas scintillator.

In alternative embodiments, more than one layer of detector elements 2 may be used. The array of scintillator crystals or other scintillator elements may comprise a multi-layer array. For example, a second layer of scintillator crystals may be placed at a greater radial distance from the axis than a first layer of scintillator crystals. In further embodiments, the PET detector apparatus may comprise an axial PET detector (in which crystals may be layered radially). The crystals of the second layer may be adjacent to crystals of the first layer.

The detector elements may comprise semiconductor detector elements in some embodiments. For example the detector elements may comprise cadmium zinc telluride (CZT) detector elements, cadmium telluride (CdTe) detector elements, silicon (Si) detector elements, germanium (Ge) detector elements, or any other suitable semiconductor detector elements, for instance as described in "Recent Developments in PET detector technology", Phys Med Biol 2008 Sep. 7; 53(17): R287-R317, T K Lewellen, which is hereby incorporated by reference. The array of semiconductor detector elements may comprise a single-layer or multi-layer array.

In some embodiments, the detector elements 2 may comprise CZT (cadmium zinc telluride) detectors, which may provide three-dimensional information on hit position.

The detector elements 2 may comprise gas scintillators in wire chambers. The PET detector may be a three-dimensional PET detector or a two-dimensional PET detector.

Light produced by each scintillator crystal is captured by a light detector. In the present embodiment, the light detectors are photomultiplier tubes. In some embodiments, the photomultiplier tubes may be multi-anode photomultiplier tubes. In other embodiments, the light detectors may be avalanche photodiodes (which may be silicon photomultipliers). Silicon photomultipliers may be avalanche photodiodes operated in Geiger mode. Avalanche photodiodes not operated in Geiger mode may be used for photon detection. In some embodiments, the light detectors may be micro channel plate detectors. Micro channel plate detectors may provide good time resolution and superior insensitivity to magnetic fields. In further embodiments, any suitable light detector may be used.

Readout electronics capture the signal from the photomultiplier tube. In the present embodiment, the PET system has crystal-by-crystal readout. Data is recorded individually for each scintillator crystal. In other embodiments, the crystals may be arranged in blocks, and block-by-block readout may be provided.

In modern PET detectors, scintillator blocks may be provided. The scintillator blocks may be cut part of the way down to create some of the effects of an array. For example, four photomultiplier tubes might be attached to a block which has been partially segmented into a 13×13 array. The depths of the segment cuts may vary across the surface facing the subject. The cuts at the edges of the block may go almost all the way through the block while the central cuts may be the least deep. Energy weighting between the four photomultiplier tubes may be used to reconstruct the hit position more accurately than for single crystal to photomultiplier tube coupling when the crystal size is the same size as the photomultiplier tube window (larger than the partial segmentations). In some systems, it may be possible to determine that there is a high probability for inter-crystal scattering to have occurred in specific regions of an image at the face of a partially segmented block. In some circumstances it may be possible to determine that inter-block scattering has occurred.

In some embodiments, readout of groups of crystals may be possible as long as four hits can be identified. For example, four blocks may be read out, with each block containing an array of crystals.

In some embodiments, it may be possible to use readout systems where the light that is emitted from a segmented array of crystals is read by a position sensitive photomultiplier tube. There may be signal strength in between the peak intensities that are associated with the individual crystals. That signal strength may represent double crystal hits (in which a photon is scattered in one crystal and absorbed in another crystal).

PET scanner system 1 further comprises a coincidence detector 9 which is configured to trigger on paired events according to criteria described below, and a processing unit 10 that is configured to process data received from the coincidence detector 9 and to perform image reconstruction. Each of the coincidence detector 9 and processing unit 10 may comprise, for example, a PC, a laptop, a server, a workstation, or any appropriate computing apparatus. In some embodiments, a single computing apparatus comprises the coincidence detector 9 and processing unit 10. In further embodiments, the functionality of the coincidence detector 9 may be provided by dedicated electronic hardware. In some embodiments, the processing unit 10 may comprise two or more computing apparatuses, for example one computing apparatus configured to perform initial data processing and a further apparatus configured to perform image reconstruction.

In further embodiments, a PET data processing apparatus is provided which comprises a coincidence detector 9 and processing unit 10, but does not comprise a PET detector. The PET data processing apparatus may receive and process data from a separate PET detector. The data may be stored in a data store before being received and processed by the PET data processing apparatus.

Figure 2:
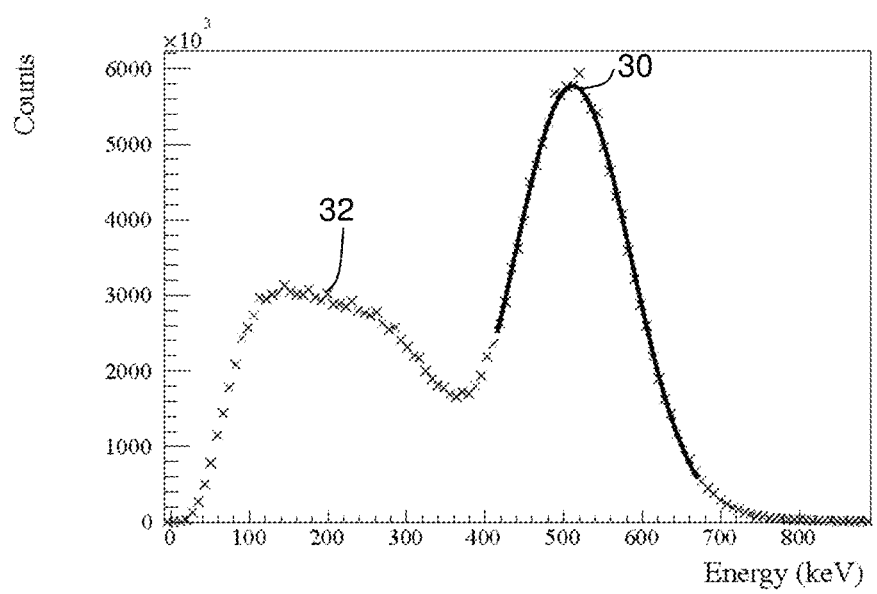
FIG. 2 is a plot of count versus energy for detected photons.

FIG. 2 is an example of an energy-calibrated spectrum from a single exemplary scintillator crystal channel. A number of events (number of energy depositions) is plotted against the energy of the events. The peak 30 of the plot occurs at an energy of 511 keV. The peak 30 may be referred to as a photo peak. The peak 30 may be broadened due to the finite energy resolution of the detector. Energies within the peak 30 may correspond to events in which a 511 keV photon is absorbed fully by the scintillator crystal. The peak 30 is fitted with a Gaussian with a mean value of 511.3 keV and a standard deviation of 74.8 keV.

In addition to the 511 keV peak, the plot contains a further region 32 which contains a substantial number of counts, but less than the peak, and extends from around 100 keV to around 300 keV. This further region 32 is representative of events in which only a part of the 511 keV energy of an annihilation photon is deposited into the scintillation crystal in question. Such events may occur when a photon is Compton scattered in the body (and loses some of its energy in the scattering, depositing the remaining energy into the scintillator crystal) and/or when a photon is Compton scattered in a scintillator crystal (depositing part of its energy into that scintillator crystal and the remainder of its energy into one or more further scintillator crystals). There may be a contribution from backscattering events (peak at 170 keV) in which a photon scatters from an external scattering object at 180° polar angle into the crystal.

The theoretical top limit of the further region 32 may be the theoretical Compton edge, which is 340 keV for 511 keV photons. Energy resolution effects may cause larger energy values for scattering events to be recorded. Therefore, scattering events may contaminate the photo peak 30. The theoretical lower limit of the further region 32 may approach 0 keV. Rayleigh scattering may occur for which little energy is deposited. The range of energies over which the further region 32 extends may differ for different PET detectors. The resolution of PET detectors may vary depending on factors such as crystal type and light collection efficiency. The photo peak 30 may not be as well resolved as is shown in FIG. 2. Compton events from the further region 32 may smear into the photo peak region 30 due to experimental resolution.

In some current PET scanners, only events in which the energy of each photon falls within the 511 keV peak 30 are used in image reconstruction. In some PET scanners, the window used to capture events may be changed to sample Compton events that occur in the further region 32. Single hits with energies in the further region 32 may be used to try to estimate the effect on the detected energy of in-patient scattering. The estimated scattering may be extrapolated to the photo peak region 30 using models.

In embodiments described below, events in the further region 32 (events in which only part of the 511 keV energy is deposited in an individual scintillator crystal) may be used in image reconstruction. The image reconstruction method makes use of events in which each of a pair of back-to-back photons is scattered in a respective first detector crystal and absorbed in a respective second detector crystal. The methods of embodiments below can use the polarisation properties of pairs of back-to-back photons to attempt to distinguish scattering events that have undergone in-patient scattering from events that have not undergone in-patient scattering. Removing events that have undergone in-patient scattering from a PET data set may improve the noise in an image that is reconstructed from that data set. Events that are considered to have undergone in-patient scattering may include any events that have been scattered before arriving at the detector crystals. In-patient scattering may include, for example, scattering in the bed on which the patient is lying, scattering in lead shielding, scattering in collimation septa, or scattering in any other part of the apparatus before arrival at the scintillator crystals.

It is known that back-to-back photons that are produced when a positron annihilates with an electron are necessarily polarised at right angles to each other and quantum-mechanically entangled. This means that, for example, when both photons undergo Compton scattering, their resulting scattering trajectories are probabilistically related. If a relative azimuthal angle is defined as the difference between an azimuthal angle of the first scattered trajectory and an azimuthal angle of the second scattered trajectory, the link between the scattered photon trajectories results in an asymmetry in the distribution of relative azimuthal scattering angle ($\Delta\varphi$) for entangled photon pairs. To give a specific example, the paired photons are more likely to scatter at $\Delta\varphi=90°$ than at $\Delta\varphi=0$.

By contrast, paired photons in which one or both photons undergo in-patient scattering lose entanglement before reaching the scintillator crystals. When a pair of non-entangled photons each scatter in a respective scintillator crystal, the relative scattering angles of the first and second photon in each pair do not have the same relative azimuthal scattering angle distribution as entangled photons.

Snyder et al (H. A. Snyder, S. Pasternak, J. Hornbostel, Angular Correlation of Scattered Annihilation Radiation, Physical Review Vol. 73, No. 5, Mar. 1, 1948), which is hereby incorporated by reference, describes a simple experimental setup that could be used to measure a relative azimuthal scattering angle distribution. FIG. 1 of Snyder shows the relative azimuthal scattering angle $\Delta\varphi$ in the context of the experimental setup. FIG. 1 of Snyder shows a detector system that is suitable for measuring the distribution of paired Compton scattering for back-to-back photons as a function of the relative scattering angle $\Delta\varphi$ and polar scattering angles $\theta_1$ and $\theta_2$.

A source of annihilation radiation, positron source S, is located in a lead collimator. Pairs of back-to-back photons pass through a narrow channel in the lead collimator. One photon of a pair is scattered by scatterer 51 and detected by detector C1 and the other is scattered by scatterer S2 and detected by detector C2. C1 and C2 are scintillation detectors that are used to count each time a photon is scattered from objects S1 and S2 into them.

Consider first the photon that is scattered by S1 and detected by C1 (which may be referred to as the first photon). A spherical coordinate system is defined in which the original direction of travel of the first photon defines the zenith of the spherical coordinate system. Polar angle $\theta=\theta_1$ in this case is the angle between the zenith and the trajectory of the scattered photon. An azimuthal angle φ in this case is an angle in the plane orthogonal to the original direction of travel. In FIG. 1 of Snyder the azimuthal angle of the scattered photon is 0°.

Turning to the photon that is scattered by S2 and detected by C2 (which may be referred to as the second photon), a polar angle $\theta=\theta_2$ is taken as being between the original direction of travel of the second photon and the trajectory of the scattered photon. An azimuthal angle φ of the scattered second photon is determined in the same coordinate scheme as that in which the azimuthal angle φ of the first photon is determined. A relative azimuthal angle between the photons can then be determined by subtracting the azimuthal angle of the first photon from the azimuthal angle of the second photon (or vice versa). In FIG. 1 of Snyder, the azimuthal angle of the first photon is 0°, so the relative azimuthal angle between the first and second photons is φ.

The fact that the photons are entangled makes some relative azimuthal angles more likely than others. The distribution of relative azimuthal angles is dependent on polar scattering angles $\theta_1$ and $\theta_2$.

An azimuthal asymmetry A may be defined for events in which the two photons have the same polar scattering angle, $\theta_1=\theta_2$. The azimuthal asymmetry A is defined as the ratio of the number of photon pairs having a relative azimuthal angle of φ=90 to the number of photon pairs having a relative azimuthal angle of φ=0.

$$A(\theta_1=\theta_2) = \frac{P(\Delta\varphi=90)}{P(\Delta\varphi=0)} = \frac{N(\Delta\varphi=90)}{N(\Delta\varphi=0)}$$

where $P(\Delta\varphi)$ is the probability that a paired Compton PET event will occur at $\Delta\varphi$, $N(\Delta\varphi)$ is the number of counts that occur at $\Delta\varphi$, and $\theta_1$ and $\theta_2$ are the polar scattering angles of the back-to-back photons.

An azimuthal asymmetry may also be defined for events in which the photons have different polar scattering angles, in which case the asymmetry is calculated as a function of both polar angles, $\theta_1$ and $\theta_2$.

FIG. 2 of Snyder is a theoretical plot of azimuthal asymmetry against polar scattering angle θ where both photons scatter with the same polar scattering angle, $\theta_1=\theta_2$. It may be seen that at low polar scattering angles (for example, 30°) and at high polar scattering angles (for example, 150°) there is little enhancement of the azimuthal asymmetry even though the photons are entangled. That is, at low and high polar scattering angles, the number of events with a relative azimuthal angle of φ=90 is almost equal to the number of events with a relative azimuthal angle of φ=0. However, at polar scattering angles θ around the middle of the plot (for example, between 70° and 100°), the azimuthal asymmetry A is substantial. For example, for events in which the paired photons each scatter at a polar scattering angle of θ=90°, the ratio of the number of photon pairs scattering with a relative azimuthal angle of φ=90° to the number of photon pairs scattering with a relative azimuthal angle of φ=0° is 2.60.

Figure 3:
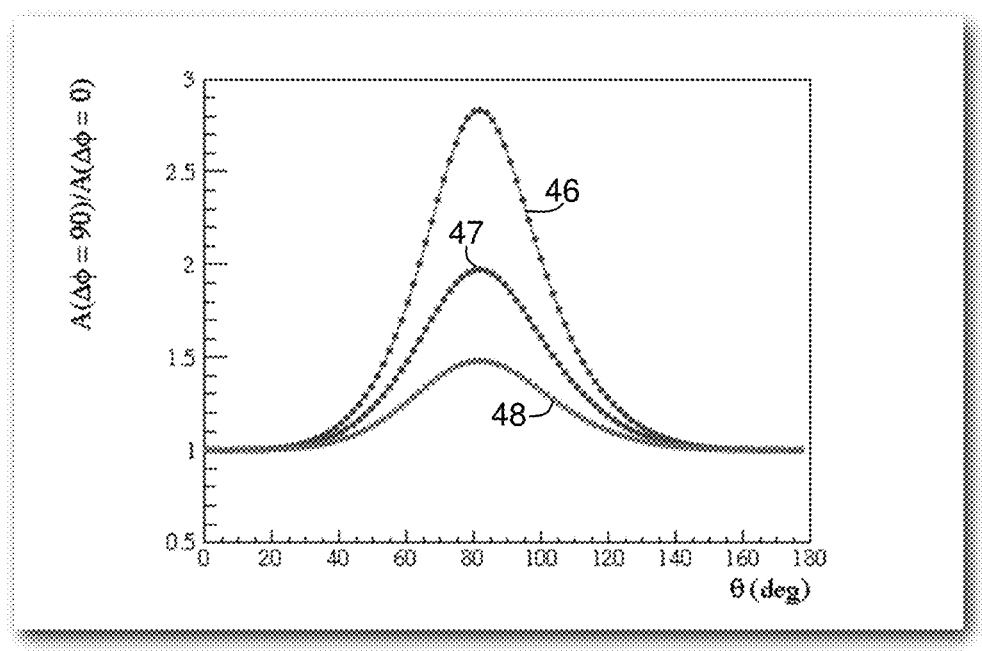
FIG. 3 is a plot of azimuthal asymmetry against scattering angle, in which detector resolution is taken into account.

FIG. 3 is a plot of azimuthal asymmetry against polar scattering angle θ (where $\theta=\theta_1=\theta_2$) which takes into account detector angular resolution in relative azimuthal angle $\Delta\varphi$. Lines 46, 47 and 48 are representative of theoretical results at different detector angular resolutions in $\Delta\varphi$. The detector resolutions in $\Delta\varphi$ are 1° for line 46, 30° for line 47, and 45° for line 48. FIG. 3 shows that the measured angular asymmetry is expected to be less when the detector angular resolution is lower.

The angular asymmetry is a property of the polarisation and entanglement properties of the back-to-back photons. Photons that are not entangled and that are unpolarised are not expected to exhibit the angular asymmetry that is illustrated in FIG. 2 of Snyder and FIG. 3. The related polarisation and entanglement properties of back-to-back photons that do not undergo in-patient scattering may be used to produce images with improved contrast as described below with reference to FIGS. 4 and 5.

As stated above, in some current PET imaging systems, an aim may be to retain only events in which back-to-back photons are detected through total energy absorption (via the photoelectric effect) in scintillating crystals located at opposite sides of the detector ring within a given time interval. Such systems may only use events in which two photons each deposit substantially all their energy into a respective single scintillating crystal (which may be called a two-hit event). In a system which aims to detect back-to-back photons through total energy absorption, in-patient scattering events may not be easily isolated. In-patient scattering events may be a primary cause of image degradation.

Four-hit events are events in which four energy depositions occur: two for the first photon and two for the second photon. Four-hit events may be events in which Compton scattering is followed by a subsequent energy deposition for other photons in opposite pairs (or groups) of scintillation detectors. It has been found at, when four- (or more-) hit events are included, it may be possible to assign a likelihood that in-patient scattering occurred. The $\Delta\varphi$ distribution of events is altered when in-patient scattering occurs, due to a rotation of the polarisation vector and loss of quantum entanglement. Therefore a measured $\Delta\varphi$ distribution of four-hit paired Compton events may be used to determine a likelihood that events have undergone scattering in the patient before entering the scintillator crystals.

It may also be possible to quantify the contribution from random events in which two photons from different positron annihilations are mistaken for back-to-back photons. Two positron annihilations may occur within the resolving time of the PET detector, resulting in four photons. If only two of the photons (one from each annihilation) escape the patient and are registered in the detector then the image produced from these events may be erroneous. However, the two detected photons would have no polarisation correlation. Therefore, a method that distinguished between entangled and non-entangled events may be used to remove random coincidence events.

Furthermore, it may also be possible to quantify a proportion of events in which one of the four energy depositions in a four-hit event results from self-emission of light in the scintillator crystal.

Figure 4:
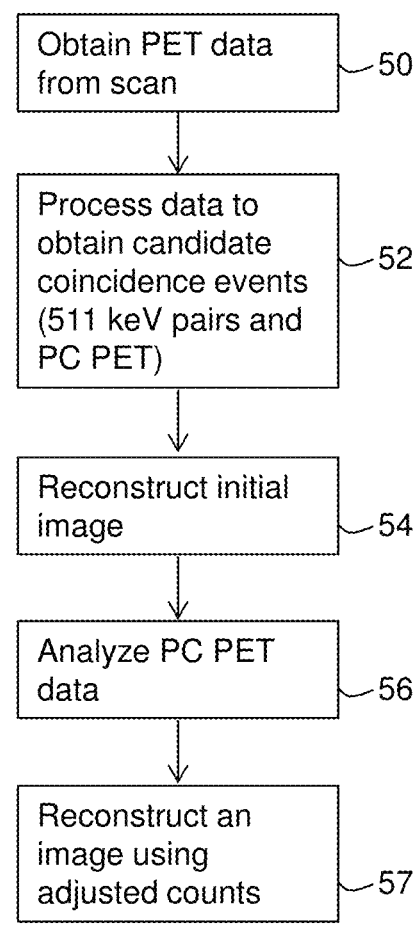
FIG. 4 is a flow chart illustrating in overview the process of a first embodiment.

FIG. 4 is a flow-chart of the process of a first embodiment. At stage 50, PET data is obtained from a PET measurement performed using the PET scanner system 1. The PET measurement may comprise a single data acquisition or a succession of data acquisitions at different times.

In the present embodiment, a radionuclide is introduced into the body of a patient, for example by injection or inhalation of a radiotracer. The radionuclide may be, for example carbon-11, nitrogen-13, oxygen-15, fluorine-18 or rubidium-82. The region of the patient may be, for example, the brain, the head, the heart, the torso, the abdomen, the breast, a blood flow system, an organ, or any region of the body. The region of the patient may be a region in which a tumour is known or suspected to exist. The patient is placed within the rings of detector elements 2 such that the region of the patient which is of interest is surrounded by the detector rings. Positrons from the radionuclide annihilate in the body of the patient and emit back-to-back photons, some of which deposit energy in the scintillator crystals 2. Light resulting from an energy deposition in a given scintillator crystal 2 is converted into an electrical signal by a photomultiplier tube. The electrical signal in the photomultiplier tube is captured by readout electronics and converted into a time, energy and position for each energy deposition event (the position being the position of the crystal in which the energy deposition occurred).

The PET data obtained from the PET measurement comprises position, time and energy data for a plurality of events, each event being a detection in an individual crystal. In further embodiments, the PET data may be block-by-block rather than crystal-by-crystal data.

Although in the present embodiment the PET data is obtained directly from a PET scan, in other embodiments the PET data may be stored data and stage 50 may comprise obtaining the PET data from any suitable data store.

At stage 52, the coincidence detector 9 receives the PET data from the PET scanner. The coincidence detector 9 operates a trigger which records only events that meet at least one given condition.

In some embodiments, the coincidence detector 9 triggers on two hits on opposite sides of the PET detector. The coincidence detector 9 may use a wider energy window than some current PET detectors in order to accept a greater number of events that have Compton scattered in a scintillator crystal.

In some embodiments, data is recorded if either of two conditions is fulfilled by the trigger. In a first condition (which may be referred to as standard PET mode operation) the trigger required the energy of each of two single hits to be in a photo peak window. In a second condition (which may be referred to as PC PET mode operation) the trigger may require the summed energy of each of two double hits to be in the photo peak window.

A crystal hit multiplicity may be tagged to each event, which indicates how many crystals were involved in that event.

The processing unit 10 processes the PET data to identify events in which a first energy deposition in a first scintillator crystal at an energy in further region 32 of FIG. 2 is followed by a second energy deposition in a second scintillator crystal. The second scintillator crystal may be adjacent to the first scintillator crystal. Identifying an event may comprise selecting and associating data elements within the PET data, for example associating a first set of position, energy and timing data to a second set of position, energy and timing data.

In the present embodiment, the processing unit 10 sets a threshold and only accepts events for which the sum of the energies of the first energy deposition and second energy deposition exceeds the threshold. Events in which a first energy deposition is followed by a second energy deposition in an adjacent crystal may occur when a photon Compton scatters in the first scintillator crystal and then is absorbed in the second detector crystal. Such events may be described as Compton events.

The processing unit 10 associates pairs of Compton events that occur at approximately the same time (for example, within a time window) on opposite sides of the PET detector and associates each pair with a line of response. Events may be considered to occur at approximately the same time if they occur within a time window of, for example, 10 ns. Pairs of Compton events may be called paired Compton events or PC PET events.

A first photon event in a first region of the PET detector array may be paired with a second photon event in a second region of the PET detector array, where the first and second region are opposite to each other. A region may refer to a part of the detector array comprising two or more detector elements (in the present embodiment, two or more scintillator crystals). Opposite regions may be any first and second region for which a line between the first and second region passes through or near the patient.

The first photon event may comprise a first photon scatter event comprising an energy deposition into a first scintillator crystal followed by an energy deposition into a second scintillator crystal. The first scintillator crystal may be adjacent to the second scintillator crystal. The second photon event may comprise a second photon scatter event comprising an energy deposition into a third scintillator crystal followed by an energy deposition into a fourth scintillator crystal. The first and second scintillator crystals may be opposite to the third and fourth scintillator crystals. The line of response is taken to be a line between the first and second region.

In the present embodiment, no time of flight processing is used. In further embodiments, time of flight processing may be used to associate each event with a particular portion of a line of response.

The Compton equation is an equation that relates the scattering energy of a Compton scattering event to its polar scattering angle $\theta$. The processing unit 10 determines a polar angle $\theta_1$ for the first photon scatter event using the energy deposited in the first scintillator crystal. In the present embodiment, the processing unit 10 makes a further determination of polar angle $\theta_1$ using the energy deposited in the second scintillator crystal. The processing unit 10 determines a polar angle $\theta_2$ for the second photon event using the energy deposited in the third scintillator crystal. In the present embodiment, the processing unit 10 makes a further determination of polar angle $\theta_2$ using the energy deposited in the fourth scintillator crystal. The processing unit 10 assigns each determined polar angle to an angular bin. In further embodiments, the processing unit 10 may assign events to a polar angle bin based on the energy deposited without explicitly determining polar angles.

The processing unit 10 determines an azimuthal angle $\varphi$ for the first photon scatter event using the relative positions of the first scintillator crystal and second scintillator crystal. The resolution of $\varphi$ is dependent on crystal size. For example, the resolution may be +/−22.5°. The exact resolution may not be precisely known because hits can be anywhere within each crystal.

In some embodiments, only adjacent crystals are used. The first scintillator crystal and the second scintillator crystal are required to be adjacent. The second scintillator crystal may be required to be one of eight crystals surrounding the first scintillator crystal.

In other embodiments, the first scintillator crystal and second scintillator crystal may be separated by more than the width of a crystal. The eight crystals surrounding the first scintillator crystal may be called nearest neighbours. The eight nearest neighbour crystals may be surrounded by sixteen next-nearest neighbour crystals. In some embodiments, the second scintillator crystal may be a nearest neighbour crystal or a next-nearest neighbour crystal to the first scintillator crystal. Using next-nearest neighbours may offer an improvement in the measurable angular resolution over using only nearest neighbours.

Simulations show that most PC PET events detected are expected to be for nearest neighbour crystals, but that some may occur in next-nearest neighbour crystals and next-next-nearest neighbour crystals. The probability of a PC PET event occurring may sharply reduce with the distance between the first scintillator crystal and the second scintillator crystal.

The processing unit 10 determines an azimuthal angle φ for the second photon scatter event using the relative positions of the third scintillator crystal and fourth scintillator crystal. The processing unit 10 determines a relative azimuthal angle between the first event and second event by subtracting the azimuthal angle for the first event and the azimuthal angle for the second event. The processing unit 10 assigns each determined relative azimuthal angle to an angular bin. In further embodiments, the processing unit 10 may assign a pair of azimuthal angles to an azimuthal angle bin without explicitly calculating a relative azimuthal angle. In other embodiments, the processing unit 10 may assign a paired Compton event to an azimuthal angle bin based on which scintillator crystals are the first, second, third and fourth crystals without explicitly calculating azimuthal angles.

Figure 6A:
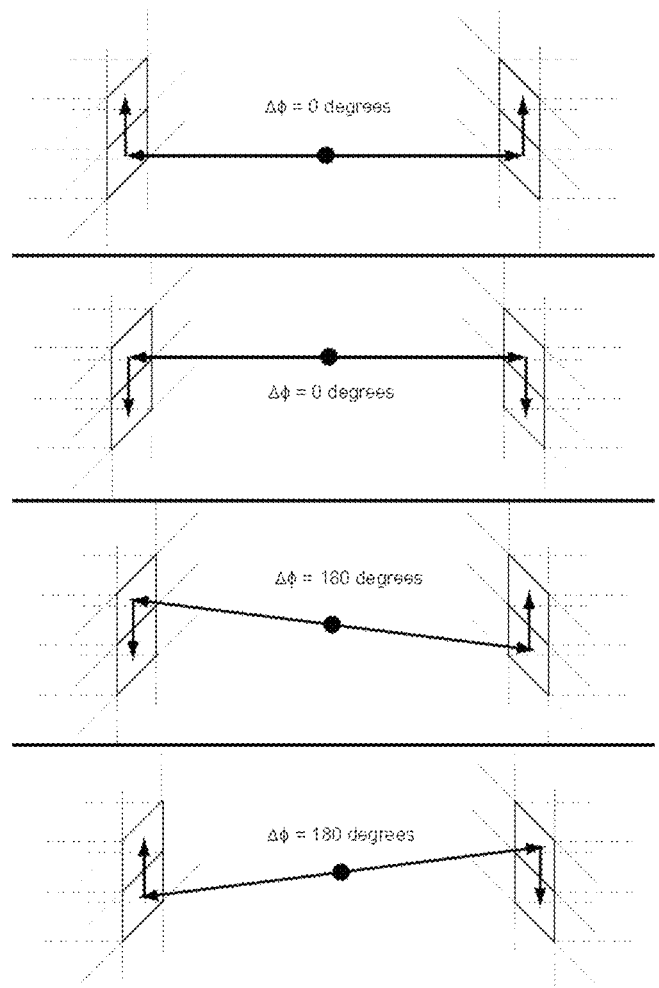
FIG. 6a is a diagram representing an ambiguity in relative azimuthal scattering angle.

FIG. 6a illustrates an ambiguity in relative azimuthal scattering angle. FIG. 6 represents two scintillator crystals on one side of a detector, and two scintillator crystals on the opposite side of the detector. On each side of the detector, a photon scatters in one scintillator crystal and is absorbed in the other scintillator crystal. In the coordinate system shown, an event with a relative scattering angle of $\Delta\varphi=0°$ may not be distinguishable from an event with a relative scattering angle of $\Delta\varphi=180°$.

For each photon detection that occurs in two scintillator crystals, for example a first and a second scintillator crystal, the processing unit 10 may not be able to determine which crystal is the first scintillator crystal (in which initial scattering occurred) and which crystal is the second scintillator crystal (in which subsequent absorption occurred). Not knowing the first hit position may mean that the line of response for a PC PET event has a greater uncertainty associated with it than the line of response for a PET event in which energy is deposited in single crystals.

If it is not possible to determine which is the first and which is the second scintillator crystal for a given photon event, there may be an ambiguity in the determination of the polar scattering angle. It is possible to perform the technique of the present embodiment without knowing the polar scattering angle unambiguously but additional uncertainties may arise.

Figure 6B:
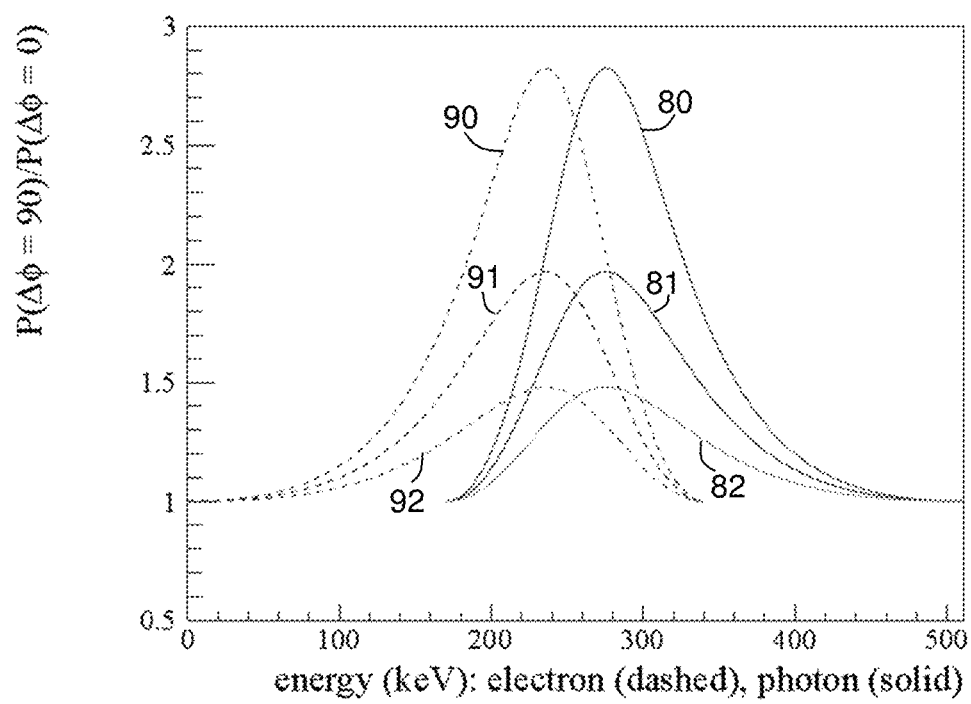
FIG. 6b is a plot of azimuthal asymmetry amplitude as a function of electron and photon energies after Compton scattering.

FIG. 6b shows azimuthal asymmetry amplitude as a function of electron and photon energies after Compton scattering (first and second deposits). One common energy range can be selected for first and second interactions which would maintain a large asymmetry. Lines 80, 81 and 82 of FIG. 6b are representative of photon energies (for detector resolutions of 1° for line 80, 30° for line 81, and 45° for line 82). Lines 90, 91 and 92 of FIG. 6b are representative of electron energies (for detector resolutions of 1° for line 90, 30° for line 91, and 45° for line 92).

In some embodiments, techniques may be used to indicate which crystal is the first scintillator crystal and which is the second scintillator crystal for a given event. For example, techniques used may be similar to those detailed in T Kamae, R Enomoto and N Hanada, A new method to measure energy, direction, and polarization of gamma rays, Nuclear Instruments and Methods in Physics Research Section A: Accelerators, Spectrometers, Detectors and Associated Equipment, Volume 260, Issue 1, 1 Oct. 1987, pages 254 to 257, which is hereby incorporated by reference.

The processing unit 10 determines a set of paired PC PET event data. The paired PC PET event data may be representative of a number of event counts for each line of response, the number of event counts for each line of response also being subdivided into a number of counts for each of a plurality of relative azimuthal angle bins. The paired event data may be provided, for example, as a list or as a sinogram. If a sinogram is used, the sinogram may be associated with additional data that is representative of bin ranges for relative azimuthal angle. The sinogram may be associated with additional data that is representative of bin ranges for polar angle/s or energy/energies.

Sinogram data is used in some existing PET systems to minimise the required storage space. Sinograms on their own may only contain enough information to reconstruct a set of lines of response. In the present embodiment, information on bin ranges for relative azimuthal angle and for polar angle/s or energy/ies may also be required.

If list-mode data is used, then binning by angle and/or energy may not be required until the image reconstruction stage.

In embodiments for which the scanner system is a PET-CT system, attenuation coefficients may be constructed during or after a CT scan. List-mode data may then be captured in a PET scan. When the PET image is reconstructed there may be the option of using the attenuation coefficients from the CT scan to improve the image.

In the present embodiment, the paired PC PET event data comprises only events in which the polar angle $\theta_1$ for the first photon in the pair has been determined to fall within the same angular bin as the polar angle $\theta_2$ for the second photon in the pair. In other embodiments, events in which the photons have larger differences in polar angle may be included. The PC PET event data comprises a number of counts for each line of response, the number of counts for each line of response also being subdivided into a number of counts for each of a plurality of relative azimuthal angle bins.

In the present embodiment, the processing unit 10 also identifies events in which an energy in the peak 30 around 511 keV has been deposited in a single scintillator crystal, and associates pairs of such events that occur within a given time window. The processing unit 10 associates each pair of events with a line of response. Pairs of events with energies in the peak 30 may be called paired 511 keV events, although in practice the peak 30 includes a range of energies around 511 keV, and therefore such events may have energies below or above 511 keV. The time window used to select paired 511 keV events may or may not be the same time window as is used to select the PC PET events.

The processing unit 10 provides data on the paired 511 keV events. For the paired 511 keV events, the data comprises a number of counts for each line of response. The data may comprise, for example, a list or a sinogram.

At stage 54, the processing unit 10 reconstructs an initial image from the paired 511 keV events and PC PET events, without using any scattering correction. For each line of response, the processing unit 10 determines a number of counts which is the sum of the number of paired 511 keV events for that line of response and the number of paired PC PET events for that line of response (including events at all relative azimuthal scattering angles). The processing unit 10 performs an iterative reconstruction to reconstruct an image from the events counts for each line of response. In other embodiments, a different reconstruction method may be used. In alternative embodiments, the processing unit 10 may reconstruct an initial image from the PC PET events only, or from the paired 511 keV events only. In further embodiments, no initial image is reconstructed and stage 54 is omitted. The initial image may be displayed to a user.

In the initial image reconstruction of stage 54, no correction is made for scattering effects. All of the paired event data from stage 52 is used to reconstruct the initial image data. The paired event data includes events in which in-patient scattering occurred. Events in which in-patient scattering occurred may have an incorrectly determined line of response. The initial image may therefore be expected to be noisy.

At stage 56, the processing unit 10 analyses the data corresponding to PC PET events. In the present embodiment, for each line of response, the processing unit 10 plots a distribution of number of counts against relative azimuth angle $\Delta\varphi$. The processing unit 10 fits a function to the distribution of counts against relative azimuth angle $\Delta\varphi$. In the present embodiment, the processing unit 10 fits a function a+b $\cos(\Delta\varphi)$+c $\cos(2\Delta\varphi)$. In other embodiments, any suitable function may be used.

Figure 7A:
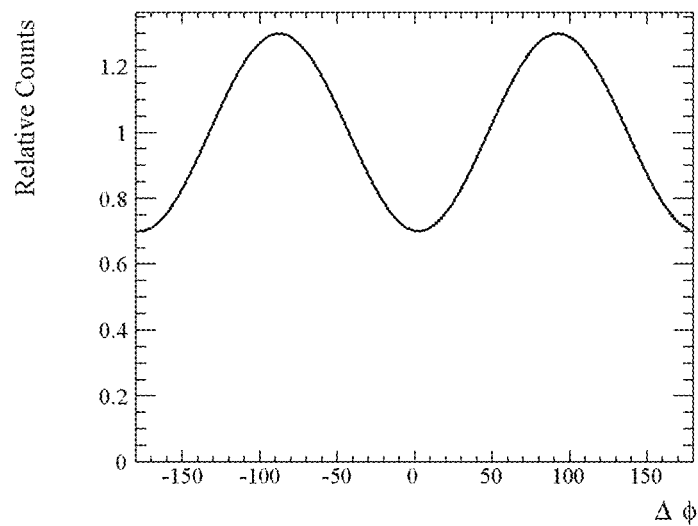
FIG. 7a is a plot of an expected relative angular distribution for entangled photons.

If the events include a large proportion of entangled photons, the fitted distribution may be expected to exhibit a $\cos(2\Delta\varphi)$ dependence. FIG. 7a shows a plot of a distribution having a $\cos(2\Delta\varphi)$ dependence. The number of events with $\Delta\varphi=90°$ is greater that the number of events with $\Delta\varphi=0°$.

It is expected that the magnitude of the $\cos(2\Delta\varphi)$ dependence may be dependent on the proportion of events in which the photons are entangled. If a low proportion of events are entangled, there may be expected to be little difference between the number of events with $\Delta\varphi=90°$ and the number of events with $\Delta\varphi=0°$, provided that the lines of response do not make large angles with respect to the surface normal of the crystals. Lines of response making large angles with respect to the surface normal of the crystals may create a cos $(\Delta\varphi)$ dependence. For non-entangled events with unrelated polarisations, the largest difference in number of counts in the azimuthal angle distribution may be the difference between the number of events with $\Delta\varphi=0°$ and the number of events with $\Delta\varphi=180°$.

The processing unit 10 compares the fitted function to a function that is representative of an ideal distribution of events in which the photons are entangled. The processing unit 10 determines from the magnitude of the $\cos(2\Delta\varphi)$ dependence a likelihood or probability that the events are entangled (or determines a likelihood or probability that the events are not entangled). The likelihood of events being entangled may be taken to be the likelihood that events received are correctly paired events that did not undergo in-patient scattering. A cos $(\Delta\varphi)$ dependence of non-entangled events can be modelled for each detector and can be taken into account in the definition of the ideal distribution. The cos $(\Delta\varphi)$ dependence can be used in the determination of likelihoods. The cos $(\Delta\varphi)$ dependence may be larger when the source is at the centre of the detector than when the source is off-centre.

The processing unit 10 adjust the number of counts for the given line of response in accordance with the determined likelihood or percentage, such that the number of counts corresponds to the number of counts that are thought to be un-scattered events (events that have not undergone in-patient scattering).

For each of the lines of response, the processing unit 10 plots a distribution, fits a function, determines a likelihood or probability in dependence on the fitted function and adjusts the number of counts. In further embodiments, the processing unit 10 groups the lines of response and plots a distribution, fits a function, determines a likelihood or probability in dependence on the fitted function and adjusts the number of counts for each group of lines of response.

In the present embodiment, data for events for which the polar angles of the first and second photon lie within the same polar angle bin is used to determine distributions. The PC PET events for each line of response are binned by relative azimuthal angle but are not separated according to polar angle $\theta$. In alternative embodiments, the PC PET events for each line of response are binned by relative azimuthal angle and by polar angle. In some embodiments, a function may be fitted to data in each theta bin. The data from each bin may be weighted in the line of response according to the fit parameters. The optimal amount of binning may depend on, for example, processing power, storage space, and the volume of data collected.

In such embodiments, the events may be plotted in a three-dimensional plot against relative azimuthal angle and by polar angle, and a three-dimensional function may be fitted to the data. The processing unit 10 determines a likelihood or probability that the events are unscattered based on the (three-dimensional) fitted function. In other embodiments, only PC PET events with polar angles between certain values may be selected for analysis, for example PC PET events with $\theta=\theta_1=\theta_2$ and $70°<\theta<100°$.

At stage 57, the processing unit 10 reconstructs an image using the adjusted number of counts for PC PET events that was determined for each line of response at stage 56. In the present embodiment, the image is reconstructed using iterative reconstruction. In other embodiments, any image reconstruction method may be used. The reconstructed image may be displayed to a user.

By measuring azimuthal asymmetry, the processing unit 10 may assess the proportion of events that are entangled and thereby determine a proportion of events that may have undergone in-patient scattering and/or been incorrectly paired. The effect of scattering events on a reconstructed image may be reduced using the azimuthal asymmetry properties of entangled photons. Therefore images with improved signal to noise may be produced using the method of FIG. 4.

In the present embodiment, only PC PET events are used in reconstructing the image at stage 57. In alternative embodiments, both PC PET events and paired 511 keV are used in reconstructing the image of stage 57. The processing unit 10 adjusts the event counts for the paired 511 keV events in accordance with the likelihood or percentage that was determined at stage 56, such that the number of counts corresponds to the number of counts that are thought to be un-scattered events.

Figure 5:
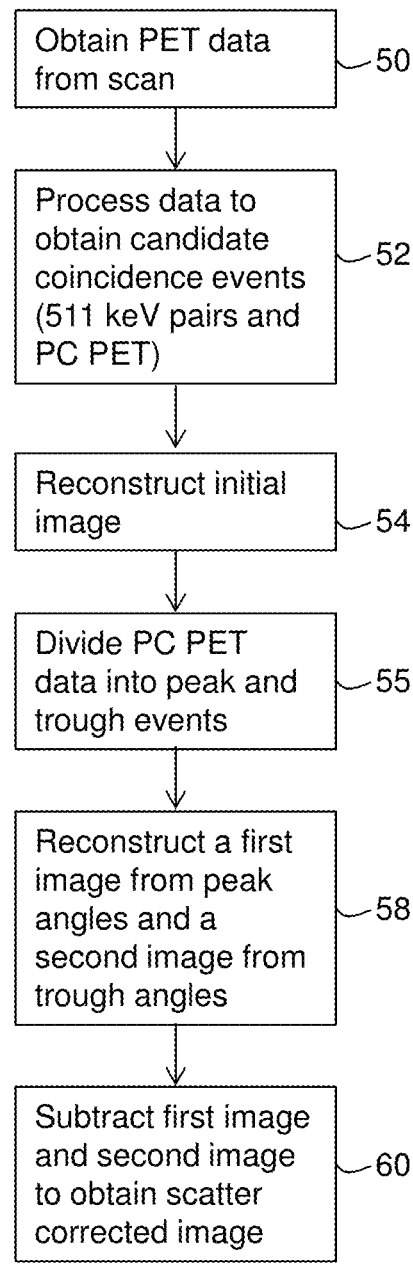
FIG. 5 is a flow chart illustrating in overview the process of a second embodiment.

The method of a second embodiment is shown in the flow-chart of FIG. 5. At stage 50, PET data is obtained from a PET scan. At stage 52, the obtained data is processed to obtain coincidence events including PC PET events and paired 511 keV events. The processing unit 10 accepts all $\theta$ scattering ranges within an acceptance which is defined by the geometry of the detector. In the present embodiment, PC PET events having polar scattering angles in an angular range of $\theta$ from 40° to 140° (97 to 326 keV) are accepted.

At stage 54, the processing unit 10 reconstructs an initial image from the paired 511 keV events and PC PET events, without using any scattering correction At stage 55, the processing unit 10 processes the data received from the coincidence detector 9 using the number of counts for PC PET events for each line of response, which is binned by relative azimuthal angle. The processing unit 10 determines, for each line of response, a number of counts that correspond to peak events and a number of counts that correspond to trough events.

Figure 7B:
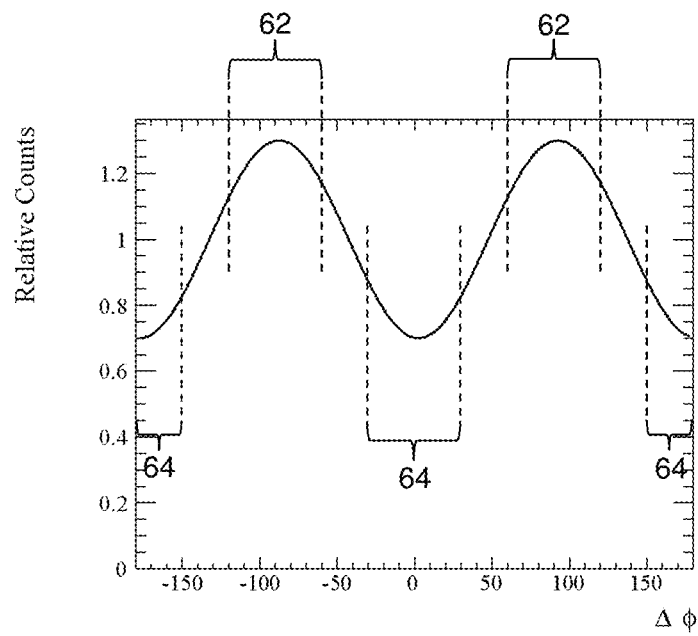
FIG. 7b is a plot of expected relative angular distribution, indicating peak and trough regions.

The terms peak and trough in this embodiment relate to the expected distribution of $\Delta\varphi$ for entangled photon, which is expected to have a $\cos(2\Delta\varphi)$ distribution as shown in FIG. 7a, with peaks centred on $\Delta\varphi=90°$ and $\Delta\varphi=-90°$, and troughs centred on $\Delta\varphi=0°$ and $\Delta\varphi=180°$. In the present embodiment, peak events are defined to be events with relative azimuth angles of $-120°<\Delta\varphi<-60°$ and $60°<\Delta\varphi<120°$ and trough events are defined to be events with $-150°<\Delta\varphi<150°$ and $-30°<\Delta\varphi<30°$. In practice, it may not be possible to distinguish an event at a given relative azimuthal angle $\Delta\varphi$ from an event with a relative azimuthal angle of $\Delta\varphi+/-180°$, due to the ambiguity described above with reference to FIG. 6a. Peak regions 62 and trough regions 64 are marked on FIG. 7b. In other embodiments, any suitable angular ranges may be used to define peak and trough events.

At stage 58, the processing unit 10 reconstructs a first image using only the PC PET events that have been identified as peak events (for example, the PC PET events for which $-120°<\Delta\varphi<-60°$ and the PC PET events for which $60°<\Delta\varphi<120°$). The image reconstruction 10 also reconstructs a second image using only the PC PET events that have been identified as trough events (for example, the PC PET events for which $-150°<\Delta\varphi<150°$ and the PC PET events for which $-30°<\Delta\varphi<30°$). In the present embodiment, the processing unit 10 reconstructs the first and second images using iterative reconstruction but in other embodiments any suitable image reconstruction method may be used.

At stage 60, the processing unit 10 subtracts the second image from the first image to obtain a scatter-corrected image.

It is expected that the difference between the number of peak events and the number of trough events may be much smaller for scattered events than for non-scattered events. It is expected that for events that have not been scattered in the body (and are therefore entangled) there will be more peak events than trough events. Therefore subtracting an image reconstructed from trough events from an image reconstructed from peak events may remove a large fraction of scattering events (which will be the same at trough as at peak) and enhance the contribution of unscattered, entangled events. By removing scattering events, the noise level of the resulting image may be improved.

Random coincidence may also be removed by subtracting peak from trough. If two photons from different annihilation events are incorrectly matched, the two photons should not be correlated in polarisation. Random coincidence events may therefore produce a distribution in which the difference between peak events and trough events is much smaller than for entangled photons.

Reconstructing a first image from peak events and a second image from trough events and subtracting the first and second images may provide a fast and efficient method of obtaining a scatter corrected image. In some embodiments, the reconstructed image may be produced at a similar speed to online images that are reconstructed using only two-hit data, for example images that are reconstructed using only paired 511 keV events.

In the present embodiment, an image is created from the peak events, an image is created from the trough events, and the two images are subtracted. In an alternative embodiment, for each line of response, a number of trough events is subtracted from a number of peak events to obtain a number of remaining events. The number of remaining events for each line of response is used to reconstruct a single, scatter-corrected image. In a further embodiment, the number of peak events is divided by the number of trough events to obtain a value for azimuthal asymmetry A, and the number of counts is scaled using the determined value for azimuthal asymmetry A.

In the present embodiment, events are accepted for which the polar scattering angle for each of the two photons is within the geometric acceptance determined by the scintillator crystals (in the present embodiment, 40° to 140°) and events having polar angles within the geometric acceptance are not grouped by polar angle. In other embodiments, events may be separated according to values of $\theta$.

Computing a peak minus trough image comprises using a weighting in which the weighting of the peak is 1 and the weighting of the trough is $-1$. In other embodiments, a weighting of other than $1:-1$ may be used. In some embodiments, a weighting is used to compensate for a known or expected scatter distribution in $\Delta\varphi$ not being flat. For example, a weighting may be used to compensate for a known or expected scatter distribution having a $\cos(2\Delta\varphi)$ dependence with a smaller amplitude than the $\cos(2\Delta\varphi)$ dependence of the true coincidence events (the events with no in-patient scattering). A weighting may be used to compensate for a $\cos(\Delta\varphi)$ distribution that is introduced by photons not all arriving normally to the crystal surfaces.

Non-integer weights may be used for events in the peak and trough regions. Weighting factors for events in the peak and trough may be calculated using a plurality of fit parameters. The fit parameters may be determined by fitting a function to a plurality of azimuthal asymmetry distributions in different imaging scenarios or imaging regions. For example, the fit parameters may be determined by fitting the function $F(\Delta\varphi, \theta_1, \theta_2)=a+b\cos(\Delta\varphi)+c\cos(2\Delta\varphi)$ to a plurality of azimuthal asymmetry distributions in different imaging scenarios or imaging regions. For example, different imaging scenarios may comprise using phantom data events in which in-patient scatter is expected to be dominant (events reconstructed out with an object), using a point source, using simulated data, using data from a standard PET scan. Events may be weighted event-by-event.

Events in which large-angle in-patient scattering occurs may be more problematic in image reconstruction than events in which small-angle in-patient scattering occurred. While quantum entanglement is lost during in-patient scattering, the degree of relative polarisation direction retained by the scattered photon should be greater for small-angle in-patient scattering than in the case where large-angle in-patient scattering occurred. Applying the method of FIG. 4 or 5 may remove a greater proportion of large-angle scattered events than small-angle scattered events.

The methods described above with reference to FIGS. 4 and 5 may be faster than some known methods of scattering correction. The methods of FIGS. 4 and 5 may be less computationally intensive than some known methods of scattering correction. In some circumstances, the methods of FIGS. 4 and 5 may be performed in real time. For example, the method of FIG. 4 or 5 may be performed during or shortly after the acquisition of PET data in a PET scan.

The method of FIG. 4 or 5 may enable the proportions of true and false coincidences in a distribution to be better quantified, using the properties of entangled photon events. The method of FIGS. 4 and 5 may provide a method for determining the scattering that is actually present in the region of the photo peak 30. The change in the size of a modulation in $\Delta\varphi$ resulting from the loss of entanglement in in-patient scattering may be used to inform PET imaging.

The methods of FIGS. 4 and 5 may allow a lower energy range to be used than may be used in some standard PET processes. The method of FIGS. 4 and 5 may allow lower energy depositions to be included, not only to distinguish scattered events but to also distinguish random events from separate annihilations and/or due to the self-emission of scintillator materials. Self-emission of scintillator light tends to occur at a lower energy than the energy used for standard PET but could contribute when the energy range accepted for recorded data starts from a lower value.

Although the embodiments described above with relation to FIGS. 4 and 5 describe an image reconstruction using iterative reconstruction, any suitable image reconstruction algorithm may be used. In some embodiments, filtered back-projection may be used. In some embodiments, a maximum likelihood image reconstruction algorithm may be used. The calculation of azimuthal angles described above may be used to determine a likelihood that a given event has been scattered in the body before reaching the detectors.

In some embodiments, data concerning PC PET events obtained by the coincidence detector 9 may be used as input to a simulation, for example a Monte Carlo simulation. The simulation may be used to determine which events are scattering events. In some embodiments, an image is reconstructed using the method of FIG. 4 or FIG. 5, and a further image is reconstructed later in which a Monte Carlo simulation has been performed to model the distribution of mass inside the patient that best matches the observed events (which may include PC PET events and/or paired 511 keV events).

In embodiments described above with reference to the flow chart of FIG. 4, photon events are detected in which a photon scatters in a first scintillator crystal and the scattered photon then deposits its energy in a second scintillator crystal, for example a neighbouring scintillator crystal. An azimuthal angle for the photon event may be determined based on the positions of the first and second scintillator crystals. In some embodiments, it is only known that an energy deposition occurred in a particular scintillator crystal. The resolution of the position that may be obtained for an energy deposition may be limited by the size of the scintillator crystal. The position of the energy deposition may be taken to be the position of the scintillator crystal.

In other embodiments, it is possible to discriminate where in a detector element (for example, where in a scintillator crystal or semiconductor crystal) an energy deposition occurred.

The detector element may be considered to comprise a plurality of detection regions, which may also be referred to as active detection regions. Detection regions may be minimum resolvable spatial regions of the detector element. A position of an energy deposition may be determined by identifying a detection region in which the energy deposition occurred.

In some embodiments, a photon event is detected by detecting two energy depositions in a single detector element, for example a single semiconductor detector element. The detector element and readout circuit are configured to obtain positional information for each energy deposition in the detector element. The positional information makes it possible to determine a detection region in which an energy deposition occurred, and to distinguish energy depositions in different detection regions.

In some photon events, a photon scatters in a first detection region of the detector element, depositing energy in the first detection region of the detector element. The scattered photon then deposits energy in a second detection region of the same detector element. Data obtained by the PET scanner may include position, energy and timing information for each of the energy depositions. The different positions of the energy depositions are used to obtain the azimuthal angle for the photon event. The positions of the energy depositions may be determined in dependence on the detection regions in which the energy depositions were detected. Azimuthal angles for various photon events may be used as described above, for example in image reconstruction.

In some photon events, a photon scatters in a detection region of a first detector and then deposits energy in a detection region of a second, different detector element. The positions of the detection regions in which the energy depositions occurred may be used to determine an azimuthal angle for the photon event.

In some embodiments, both photon events in which the energy depositions occur in a single detector element and photon events in which the energy depositions occur in different detector elements are used in the analysis of PET detector data, for example in reconstructing an image.

The method of the embodiments of FIGS. 4 and 5 may be performed using existing PET detector equipment, which may comprise a single layer of scintillator crystals. By using the method of FIGS. 4 and 5, statistical information may be obtained on the proportion of events that are entangled without requiring extra detectors such as a polarimeter. No additional detector layer or scatterer is required.

The method of FIGS. 4 and 5 uses a conventional PET detector comprising a single layer of scintillator crystals. PC PET events that are used in processing are events in which each photon is scattered from one scintillator crystal into another, adjacent scintillator crystal in the same layer of crystals. The polar scattering angles for the PC PET events include angles in the 70°<θ<100° region for which the angular asymmetry is expected to be particularly evident. The 70°<θ<100° region may be the region in which most Compton scattering events are expected to be detected, according to simulation studies. In a single layer geometry, there may be less chance of capturing more forward scattered events.

In further embodiments, a PET detector may comprise any suitable detector elements. A PET detector may comprise more than one layer of detector elements. Using more than one layer of detector elements may help to identify the first hit position for each photon.

In some embodiments, the PET detector comprises semiconductor detector elements, for example CZT elements, CdTe elements, Si elements or Ge elements. Each of the semiconductor detector elements may comprise a semiconducting crystal.

A 511 keV gamma photon arriving at a semiconductor detector element may deposit some or all of its energy in the semiconducting crystal. The energy deposition in the semiconducting crystal may be considered to be an electronic process. The energy deposition in the semiconducting crystal may cause the production of electron-hole pairs which are detected by electrodes of the semiconductor detector element, producing a signal which is read out by the readout electronics.

In some embodiments, a photon event is detected by detecting a first energy deposition in a first semiconductor crystal and a second energy deposition in a second semiconductor crystal. Positions of the first semiconductor crystal and second semiconductor crystal are used to determine an azimuthal angle for the photon event.

Semiconductor detector elements may be configured such that the position of an energy deposition within the semiconductor crystal may be determined. It may be possible to distinguish between the positions of energy depositions that occur in different regions of the semiconductor detector element.

In some embodiments, a photon event is detected by detecting a first energy deposition in a first detection region of a semiconductor crystal and a second energy deposition in a second detection region of the semiconductor crystal, or in a detection region of a further semiconductor crystal. Positions of the energy depositions are used to determine an azimuthal angle for the photon event. The azimuthal angle may be determined using the positions of the detection regions in which the energy depositions occurred.

Azimuthal angles for various photon events may be used as described above, for example in image reconstruction.

The PET detector may comprise a CZT detector. The CZT detector may have multiple layers of detector elements to improve spatial resolution. An improvement in spatial resolution may be achieved by reducing parallax error.

The use of multiple layers for a method similar to that described above with reference to FIGS. 4 and 5 may not alter the core method of using the azimuthal angle as an observable that may be used to provide extra information on the probability for true and false coincidences. Using multiple layers may in some circumstances increase the detection efficiency when compared with a single-layer detector. However, the use of azimuthal asymmetry may be most effective at large polar scattering angles. As detailed in the Snyder paper, the azimuthal asymmetry may be expected to be greatest at a polar scattering angle of $\theta=82°$.

Some current PET systems only use events for which each photon deposits all of its energy in a single crystal and there is no Compton scattering within the crystals. It has been found in some systems that about 50% of PET photon events have a two-crystal effect (deposit their energy in two crystals rather than in a single crystal). In some current systems, only around 25% of events may be used, because the system is looking for events for which no Compton scattering occurs in the crystals.

The number of events in which both photons are Compton scattered by respective scintillator crystals may be around 25% of the total number of annihilations. The method of FIGS. 4 and 5 makes use of events which may be neglected by existing systems.

Future PET systems are likely to use smaller crystals than those used in current systems. Smaller crystals may be used to obtain better angular resolution. The use of smaller crystals may increase the number of events in which a photon Compton scatters from one crystal to an adjacent crystal. Therefore it may become increasingly important to be able to use events in which energy is deposited across multiple crystals. Shorter crystals may accept a smaller range of polar angle $\theta$ around 90° and may therefore have more events in a polar angle range that results high azimuthal asymmetry.

Although the methods of FIGS. 4 and 5 use only events in which each photon deposits its energy into two scintillator crystals, similar methods may be extended to events in which one or both photons deposits their energy into three or more scintillator crystals. The first two hits may be used to determine azimuthal angles. Any further hits may be used to provide additional energy information.

Although the methods above relate only to PET imaging, the methods of the described embodiments may also be applied to PET-CT imaging, or to a combination of PET with MRI or PET with SPECT. Some existing SPECT machines are designed to detector photons from below 100 keV to 360 keV which matches the energy of the Compton part of the 511 keV spectrum as shown in FIG. 2. Multiple detections per photon may be recorded rather than recording an event comprising scattering in a crystal followed by photo-absorption as a single hit in a detector block. It is possible that machines with SPECT functionality may be used to test the methods of FIG. 4 and FIG. 5, by using a positron source to generate back-to-back photons in a SPECT machine.

The embodiments above have been described with reference to medical imaging of a patient. However, PET imaging may also be used for further applications, for example industrial imaging. As one example, PET imaging of metal pipes may be performed to establish flow (for example, in the oil industry, or for radioactive waste). Real time PET imaging may be used in fluid dynamics research. PET imaging may also be used to track movement in porous substances, for example sandstone, or in fractures in impermeable substances. PET imaging may be used to image water uptake in building materials, to image the extrusion of doughs or pastes, or to determine a solid distribution within slurries. PET imaging may be used to image engines or gearboxes, for example to image lubricant distribution.

In such industrial imaging, the PET data may be dominated by events that scatter in the subject. It may therefore be increasingly important to distinguish events that have scattered in the subject from events that have not scattered in the subject. In industrial PET imaging, different geometry may be used than is used for medical PET imaging. In some circumstances, the geometry may be more flexible. For example, the radii of the arrays may be adjustable to the imaging scenario. The number of crystals used may be varied. The detector system may be segmented to allow for different numbers of crystals.

In some embodiments, an existing PET scanner system may be retrofitted in such a way that the retrofitted apparatus is capable of performing the method of an embodiment. Processing software may be installed in a coincidence detector or processing unit, or in any other computing apparatus that is part of or associated with the PET scanner system. The processing software may enable the coincidence detector, processing unit and/or other apparatus to process data relating to PC PET events. The processing software may enable data relating to PC PET events to be processed based on azimuthal scattering angle in order to reduce the proportion of scattering events used in image reconstruction.

A laboratory investigation to measure the magnitude of the azimuthal asymmetry of entangled photon pairs detected in scintillator crystals was performed. The laboratory investigation is described below with reference to FIGS. 8a, 8b, 8c and 9.

Figure 8A:
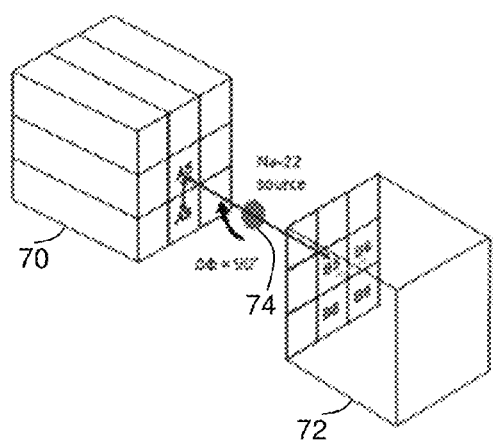
FIGS. 8a and 8b show a setup of an experiment designed to measure angular asymmetry.
Figure 8B:
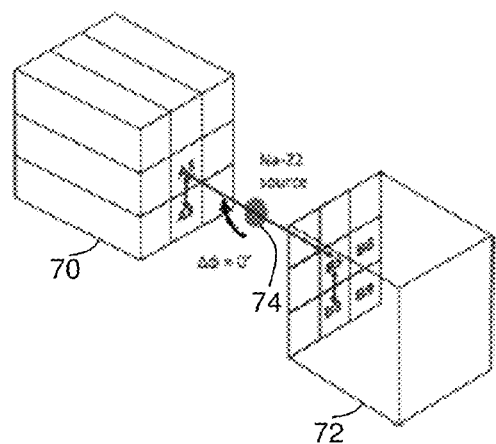
Figure 8C:
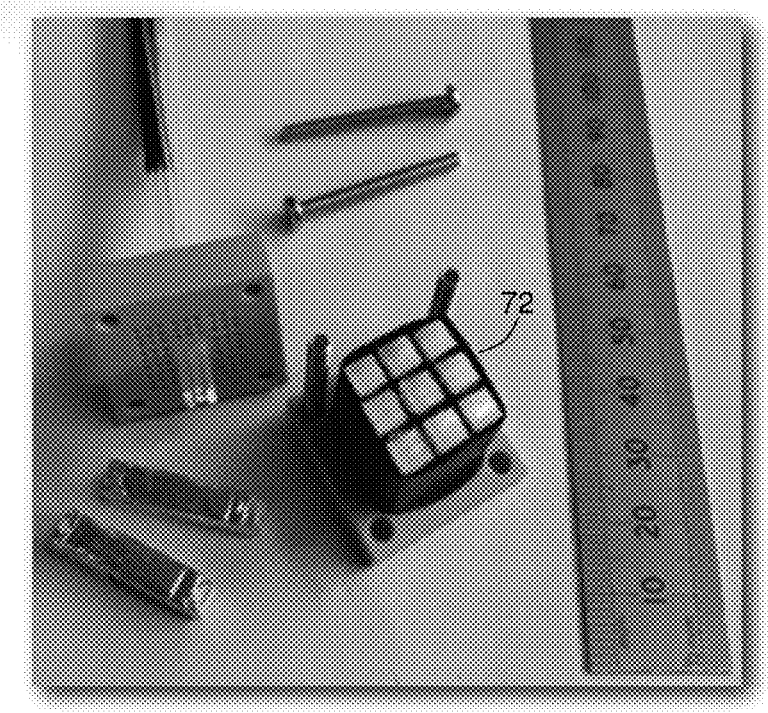
FIG. 8c is a photograph of part of the experimental setup of FIGS. 8a and 8b.

A detector system which was designed to represent a portion of a commercial PET scanner is illustrated in FIGS. 8a and 8b. Two detector blocks 70, 72 were fabricated, each comprising nine scintillator crystals. Each crystal was made from LYSO (Cerium-doped Lutetium Yttrium Orthosilicate) with dimensions 4×4×22 mm. FIG. 8c is a photograph of a detector block 72.

In the first detector block 70, two of the scintillator crystals (numbered A5 and A8 in FIGS. 8a and 8b) were each connected to a respective light detector and data-acquisition system using fibre-optic cabling. In the second detector block 72, four of the scintillator crystals (numbered B5, B6, B8 and B9 in FIGS. 8a and 8b) were each connected to a respective light detector and data acquisition system using fibre-optic cabling. Each light detector was a cylindrical Hamamatsu photomultiplier tube of 1 cm diameter. A single data acquisition system was used for all crystals.

A Na-22 source 74 was used as a positron source. The source itself was small and contained within a plastic cylinder. The plastic cylinder had a dual function of containing the source and providing a dense medium of electrons for the positrons to annihilate with. It is possible that a small amount of scattering may have occurred in the plastic cylinder holder. However, it may be expected that a large proportion of photons did not scatter before entering the scintillator crystals.

The source, which was much smaller than the size of the crystals, was positioned on the central axis of the central crystals. The central crystals were used to trigger the data acquisition system when it was operated in coincidence mode.

Some of the photons arriving at the scintillator were fully absorbed by the first scintillator crystals that they were incident upon. When a photon was received at a crystal, a corresponding charge was recorded by the data acquisition system, the charge being proportional to the energy of the photon.

Photons incident at A5 and B5 formed a charge spectrum corresponding to the energy spectrum of FIG. 2. The photo peak of the spectrum was used to calibrate the energy readings by determining the correspondence of recorded charge with energy.

To calibrate the energy readings, the data acquisition system was set to trigger on any individual channel (OR-mode), not on scintillator crystals A5 and B5 in coincidence. Pedestals of the charge spectra recorded in OR-mode were used to determine the zero point of charge for each channel. The photo peaks for each channel were fitted with Gaussian functions to determine the conversion factor of charge to energy, with the peak assumed to be 511 keV. These pedestal and charge to energy conversion factors were then used to calibrate the energy spectra in AND-mode operation.

Figure 9:
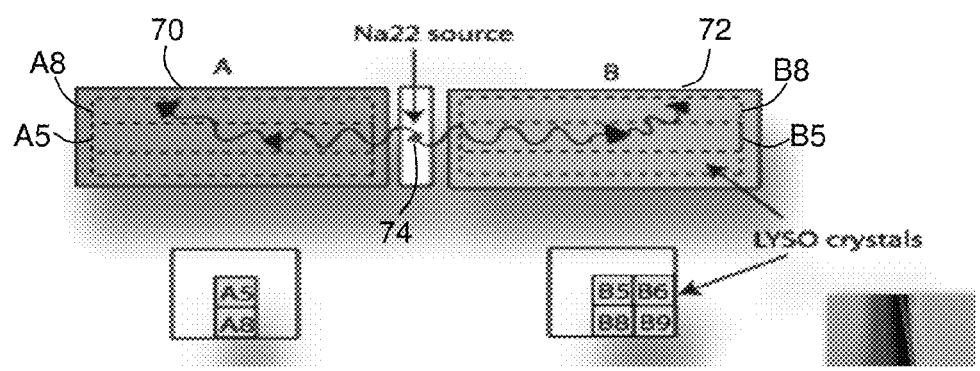
FIG. 9 is a diagram of an event in which each of a pair of back-to-back photons scatters in a respective scintillator crystal.

PC PET events of interest are events in which each of a pair of back-to-back photons undergo Compton scattering in one scintillator crystal followed by absorption in another, adjacent scintillator crystal. Such an event is illustrated in FIG. 9. A pair of back-to-back photons is emitted at or near the Na-22 source 74. A first photon of the pair of photons is incident on scintillator crystal A5 and Compton scatters, depositing a certain amount of energy which is detected as light. The amount of energy detected in scintillator crystal A5 is an energy that falls within further region 32 of FIG. 2. The scattered photon enters crystal A1 at angle ($\theta_1$, $\varphi_1$) where $\theta_1$ is the polar angle with respect to the original first photon's incident direction, and $\varphi_1$ is the azimuthal angle. The scattered photon deposits all or almost all of its remaining energy into crystal A8. The second photon of the pair of photons is incident on scintillator crystal B5 and Compton scatters, depositing some of its energy. The photon is scattered into crystal B8.

The first photon event (in A5 and A8) and second photon event (in B5 and B8) may be associated as a pair by their timing as described below. The azimuthal direction of scattering from B5 to B6 is aligned with the azimuthal direction of scattering from A5 to A8 as illustrated in FIG. 8a. This event may therefore be counted as an event for which $\Delta\varphi=0°$.

In other events, a first photon which scatters from A5 to A8 is associated with a second photon which scatters from B5 to B6. These events may be counted as events for which $\Delta\varphi=90°$.

In AND-mode operation, the data acquisition system was configured to trigger on a pair of coincident events in scintillator crystals A5 and B5. The trigger of the data acquisition system was applied to A5 and B5 and required the voltage signal (proportional to the energy deposited) to be above a threshold for both channels (a first channel representative of A5 and a second channel representative of B5). In order to form the logically positive trigger signal in coincidence mode, a signal above threshold had to occur in A5 and in B5 within a time interval of 100 ns.

The gate for a QDC (charge to digital converter) and TDC (time to digital converter) was of the order of 400 ns. For every trigger, the QDC and TDC recorded for 400 ns. Every channel in the QDC and TDC started and stopped recording input signals at the same time. Each event was recorded for the same length of time.

The gate was set to 400 ns because from the point that each photon interacts in a crystal, it takes a certain amount of time for the full distribution of optical photons resulting from the fluorescence process in the scintillator crystal to be produced and to reach the photomultiplier tube. The decay time for LYSO is about 50 ns. 400 ns was the time required to record the full energy spectrum from the PMTs.

The signals were amplified by a factor of ten after being received by the photomultiplier tube so that the recorded charge for photoelectric conversion and Compton scattering events fell within the boundaries of the QCD range. The amplifier may have caused the charge signal to be spread over a wider time range than if the signals had been taken directly from the photomultiplier tube.

The timing of the coincidence between A5 and B5 in order to generate a trigger was much shorter than the gate time. Stricter timings were then applied in the post data-taking analysis.

To count an event, two conditions were required to be met for each channel in the coincidence formulation. The first condition was a timing condition. The timing was required to fall within +/−17.5 ns of the trigger. The second condition was a polar angle condition. The polar angle calculated from the energy deposit (using the standard Compton formula relating polar angle to energy before and after scattering) was required to fall within the polar angle bin in question. Both energy deposits per photon were used to calculate the polar angle separately using the relevant variation of the Compton scattering formula. Polar scattering angle $\theta_1$ was determined twice (once from the energy deposited in A5 and once from the energy deposited in A8) and polar scattering angle $\theta_2$ was determined twice (for example, once from the energy deposited in B5 and once from the energy deposited in B8). For the experimental result, events for which the polar scattering angle fell within an angular range of 40° to 140° (97 to 326 keV) were used.

To count a PC PET event, each of A5, A8, B5 and B8 was required to satisfy the timing condition and the polar angle condition.

Normalisation events were also recorded. Normalisation events were events for which energy was deposited in one crystal (A5) in one detector block and on two crystals (B5 and B8) in the other detector block. To count a normalisation event, each of A5, B5 and B8 was required to meet the timing condition and the polar angle condition.

In a real PET scanner, it is possible that less strict conditions may be required. However, in the experiment described, the conditions were chosen because the source was weaker than those used in PET imaging, and because only 6 crystals were used.

Events for which the calculated polar angle $\theta_1$ for the first photon falls within the same angular bin as the calculated polar angle $\theta_2$ for the second photon were counted. The angular asymmetry was determined for each polar angle bin. The angular asymmetry is the ratio between the number of pair events for which $\Delta\varphi=90°$ and the number of events for which $\Delta\varphi=0$, when the photons in each pair have the same polar angle (to within a bin size).

$$A(\theta_1 = \theta_2) = \frac{P(\Delta\varphi = 90)}{P(\Delta\varphi = 0)} = \frac{N(\Delta\varphi = 90)}{N(\Delta\varphi = 0)}$$

where $P(\Delta\varphi)$ is the probability that a paired Compton PET event will occur at $\Delta\varphi$, $N(\Delta\varphi)$ is the number of counts that occur at $\Delta\varphi$, and $\theta_1$ and $\theta_2$ are the polar scattering angles of the back-to-back photons.

The count rates were normalised using three-hit events. $\Delta\varphi$ is not definable for three-hit events. The normalisation was used to account for the varying efficiencies of the different channels.

A normalised value for $N(\Delta\varphi=0°)$ was calculated by dividing the number of four-hit events on A5, A8, B5 and B8 by the number of three-hit events on A5, B5 and B8. A normalised value for $N(\Delta\varphi=90°)$ was calculated by dividing the number of four-hit events on A5, A8, B5 and B6 by the number of three-hit events on A5, B5 and B6. The asymmetry A was then calculated by dividing $N(\Delta\varphi=90°)$ by $N(\Delta\varphi=0°)$.

Figure 10:
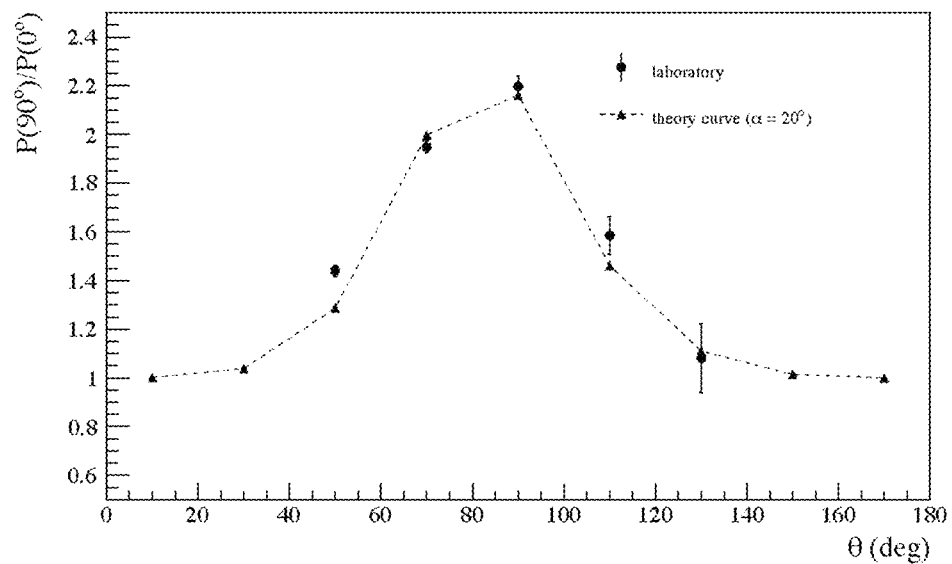
FIG. 10 is a plot of experimental measurements of azimuthal asymmetry.

The results of the experiment described above with reference to FIGS. 8a and 8b are given in FIG. 10. FIG. 10 is a plot of azimuthal asymmetry against polar angle (the polar angle being the same for each photon in the pair, to within a bin size). FIG. 10 plots laboratory results and a corresponding theory curve for the asymmetry A in the relative azimuthal scattering angle ($\Delta\varphi$) for back-to-back photons.

The triangular markers are points determined by theoretical calculation. The points determined by theoretical calculation are plotted for exact values of $\theta=\theta_1=\theta_2$. The geometrical uncertainty in polar scattering angle $\theta$ is included. The semi span was taken as half the range of the polar angle bin. In the theoretical calculation, the parameter a was set to 20° since the value of 20° was found to give the best match to experimental data. $\alpha$ is defined on page 447 of the Snyder paper and takes into account the finite geometry of the system theoretically. The true resolution of the detector is not presently known.

The round markers are points determined by the experiment described above with reference to FIGS. 8a and 8b. Experimental data points are plotted at the central polar scattering angle ($\theta$) for each bin and only include events in which $\theta_1$ and $\theta_2$ both fell within the range of the $\theta$-bin. The error bars in FIG. 10 are purely statistical and were calculated using the counts.

Figure 11:
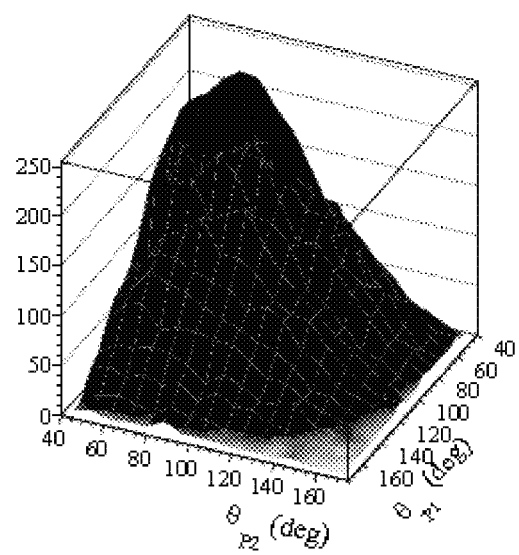
FIG. 11 is a simulated plot of paired Compton PET events.

It may be seen that the asymmetry A is largest for a region of approximately 70°<$\theta$<100°. The region 70°<$\theta$<100° coincides with the angular range over which most of the PC PET events are expected to occur in a typical PET detector system. FIG. 11 shows an output from a simulation analysis showing a distribution of detected PC PET events as a function of polar scattering angles. Number of counts is plotted against polar scattering angle $\theta_1$ and polar scattering angle $\theta_1$. Again it may be seen that most events occur in the range 70°<$\theta$<100°. The $\Delta\varphi$ asymmetry is maximal over a range of polar angles in which the simulation indicates that most PC PET events occur in a typical PET detector. Outlying points with 0.5>A>2.5 were omitted from the graph.

Systematic uncertainties may arise from the fact that some of the photons must have arrived at the surface of crystals with their direction vectors making a significant angle with respect to the surface normal. Such systematic uncertainties were not calculated. The effect of neglecting such systematic uncertainties was observed in simulated data. The effect was largest when the energy deposited in the central crystals was either in the very low or very high Compton range. The effect may have caused the asymmetry values to be slightly larger than would have occurred in a case in which all photons arrive at an angle that is normal to the crystal surface.

The laboratory results indicate that azimuthal scattering angle asymmetry may be measurable in a single-layered crystal-by-crystal readout PET detector geometry. It may be possible to obtain polarisation information from a single layer of PET crystals as is used in conventional PET detectors.

It may be understood that the present invention has been described above purely by way of example, and that modifications of detail can be made within the scope of the invention.

Each feature disclosed in the description and (where appropriate) the claims and drawings may be provided independently or in any appropriate combination.

The invention claimed is:

1. A positron emission tomography (PET) detection method, comprising:

obtaining PET data from a PET detector, wherein the PET detector comprises an array of detector elements, and wherein the PET data is representative of a PET measurement of at least part of a subject;

identifying in the PET data a plurality of paired events, wherein each paired event comprises a first photon event in a first region of the PET detector and a second photon event in a second region of the PET detector, wherein the first photon event comprises an energy deposition in a first detector element of the array or in a first detection region of the first detector element due to a scattering of a first photon at a first azimuthal scattering angle and an associated energy deposition by the scattered first photon in a second detector element of the array or in a second detection region of the first detector element or of the second detector element, and wherein the second photon event comprises an energy deposition in a third detector element of the array or in a third detection region of the third detector element due to a scattering of a second photon at a second azimuthal scattering angle and an associated energy deposition by the scattered second photon in a fourth detector element of the array or in a fourth region of the third detector element or of the fourth detector element; and processing the PET data in dependence on the azimuthal scattering angles for the paired events.

2. A method according to claim 1, wherein the processing of the PET data in dependence on azimuthal scattering angles for the paired events comprises distinguishing a proportion of paired events that relate to non-entangled pairs of photons from a proportion of paired events that relate to entangled pairs of photons.

3. A method according to claim 2, wherein at least some of the non-entangled pairs of photons are non-entangled pairs of photons resulting from previously entangled pairs of photons having become non-entangled due to scattering within the subject.

4. A method according to claim 2, wherein at least some of the non-entangled pairs of photons are incorrectly paired due to incorrect pairing of the first photon event and second photon event.

5. A method according to claim 1, wherein the array comprises a single layer of detector elements.

6. A method according to claim 1, wherein the processing of the PET data in dependence on azimuthal scattering angles for the paired events comprises determining a relative azimuthal scattering angle for each paired event.

7. A method according to claim 6, wherein determining a relative azimuthal scattering angle for each of the plurality of paired events comprises, for each paired event, determining a difference between the first azimuthal scattering angle and second azimuthal scattering angle.

8. A method according to claim 7, further comprising determining the first azimuthal scattering angle in dependence on the relative positions of the first detector element and second detector element or on the relative positions of the first detection region and the second detection region, and determining the second azimuthal scattering angle in dependence on the relative positions of the third detector element and fourth detector element or on the relative positions of the third detection region and the fourth detection region.

9. A method according to claim 6, wherein processing the PET data in dependence on azimuthal scattering angles for the paired events comprises determining a first set of paired events having a first range of values of relative azimuthal scattering angle and a second set of paired events having a second range of values of relative azimuthal scattering angle.

10. A method according to claim 9, further comprising:
reconstructing a first image from the first set of paired events;
reconstructing a second image from the second set of paired events;
weighting the first image with a first weight and weighting the second image with a second weight; and
combining the weighted images.

11. A method according to claim 10, wherein one of the first weight and second weight is 1, and the other of the first weight and second weight is −1.

12. A method according to claim 9, wherein the first range of values comprises at least one range of values in which a plot of number of counts against relative scattering angle has a peak, and the second range of values comprises at least one range of values in which a plot of number of counts against relative scattering angle has a trough.

13. A method according to claim 1, wherein processing the PET data in dependence on azimuthal scattering angles for the paired events comprises determining a distribution of azimuthal scattering angles, optionally relative azimuthal scattering angles.

14. A method according to claim 13, wherein processing the PET data in dependence on azimuthal scattering angles for the paired events further comprises a comparison of the determined distribution to an ideal distribution for paired events resulting from entangled photons.

15. A method according to claim 1, wherein processing the PET data in dependence on azimuthal scattering angles for the paired events further comprises adjusting an event count, optionally in dependence on the determined distribution of scattering angles.

16. A method according to claim 15, wherein determining a distribution of azimuthal scattering angles comprises determining a distribution of azimuthal scattering angles for each of a plurality of lines of response.

17. A method according to claim 16, wherein adjusting an event count in dependence on the determined distribution of relative scattering angle comprises adjusting an event count for each line of response in dependence on the determined distribution of relative azimuthal scattering angle for the line of response.

18. A method according to claim 15, further comprising reconstructing an image using the adjusted event count.

19. A method according to claim 1, further comprising, for each paired event, determining a polar scattering angle for the first photon event and a polar scattering angle for the second photon event.

20. A method according to claim 19, further comprising selecting paired events in dependence on the determined polar scattering angle for the first photon event and the determined polar scattering angle for the second photon event.

21. A method according to claim 1, further comprising determining a line of response for each of the paired events.

22. A method according to claim 1, wherein the PET detector is configured such that PET data may be obtained individually from each of the plurality of detector elements.

23. A method according to claim 1, wherein the PET data comprises time, energy and position data for each of a plurality of energy depositions.

24. A method according to claim 1, wherein the PET detector comprises a medical PET detector and the subject comprises a human or animal subject.

25. A method according to claim 1, wherein the at least part of the subject comprises at least one of a brain, a head, a heart, a torso, an abdomen, a tumour, a breast, a blood-flow system, an organ.

26. A method according to claim 1, wherein the PET detector comprises an industrial PET detector.

27. A method according to claim 1, wherein the at least part of the subject comprises at least part of an industrial pipe, an engine, a gearbox, or a porous substance.

28. A method according to claim 1, wherein the plurality of detector elements comprises a plurality of scintillator elements.

29. A method according to claim 1, wherein the plurality of detector elements comprises a plurality of semiconductor detector elements.

30. A method according to claim 29, wherein the plurality of semiconductor detector elements comprises cadmium zinc telluride (CZT) detector elements or CdTe detector elements or Si detector elements or Ge detector elements.

31. A computer program product comprising computer-readable instructions configured to perform a method according to claim 1.

32. A method of adapting a PET apparatus by installing processing software configured to perform a method according to claim 1.

33. A positron emission tomography (PET) apparatus, comprising a PET detector, a coincidence detector and a processing unit, wherein the PET detector comprises an array of detector elements and readout electronics for reading out signals from the plurality of detector elements;

wherein the PET detector is configured to obtain PET data representative of a PET measurement of at least part of a subject;

wherein the coincidence detector is configured to identify in the PET data a plurality of paired events, wherein each paired event comprises a first photon event in a first region of the PET detector and a second photon event in a second region of the PET detector, wherein the first photon event comprises an energy deposition in a first detector element of the array or in a first detection region of the first detector element due to a scattering of a first photon at a first azimuthal scattering angle and an associated energy deposition by the scattered first photon in a second detector element of the array or in a second detection region of the first detector element or of the second detector element, and wherein the second photon event comprises an energy deposition in a third detector element of the array or in a third detection region of the third detector element due to a scattering of a second photon at a second azimuthal scattering angle and an associated energy deposition by the scattered second photon in a fourth detector element of the array or in a fourth detection region of the third detector element or of the fourth detector element; and wherein the processing unit is configured to process the PET data in dependence on the first and second azimuthal scattering angles for the paired events.

34. A PET apparatus according to claim 33, wherein the plurality of detector elements comprises a plurality of scintillator crystals, optionally wherein the plurality of detector elements comprises at least one of Cerium-doped Lutetium Yttrium Orthosilicate crystals, bismuth germanium oxide crystals, gadolinium oxyorthosilicate crystals, Lutetium Orthosilicate crystals, sodium iodide crystals.

35. A PET apparatus according to claim 33, wherein the detector elements comprise semiconductor detector elements.

36. A PET apparatus according to claim 35, wherein the semiconductor detector elements comprise cadmium zinc telluride (CZT) detector elements or CdTe detector elements or Si detector elements or Ge detector elements.

37. A PET apparatus according to claim 33, wherein the array of detector elements comprises a plurality of light detectors, the plurality of light detectors comprising at least one of: photomultiplier tubes, avalanche photodiodes, silicon photomultipliers.

38. A PET apparatus according to claim 33 wherein the readout electronics are configured to provide crystal-by-crystal readout.

39. A PET data processing apparatus comprising a coincidence detector and a processing unit, wherein the coincidence detector is configured to receive PET data representative of a PET measurement of at least part of a subject and to identify in the PET data a plurality of paired events, wherein each paired event comprises a first photon event in a first region of the PET detector and a second photon event in a second region of the PET detector, wherein the first photon event comprises an energy deposition in a first detector element of the array or in a first detection region of the first detector element due to a scattering of a first photon at a first azimuthal scattering angle and an associated energy deposition by the scattered first photon in a second detector element of the array or in a second detection region of the first detector element or of the second detector element, and wherein the second photon event comprises an energy deposition in a third detector element of the array or in a third detection region of the third detector element due to a scattering of a second photon at a second azimuthal scattering angle and an associated energy deposition by the scattered second photon in a fourth detector element of the array or in a fourth region of the third detector element or of the fourth detector element; and wherein the processing unit is configured to process the PET data in dependence on the first and second azimuthal scattering angles for the paired events.

* * * * *